United States Patent [19]
Sugimoto et al.

[11] Patent Number: 5,978,322
[45] Date of Patent: *Nov. 2, 1999

[54] OPTICAL RECORDING MEDIUM HAVING A PARAMETER FOR IDENTIFYING THE FORMAT OF DATA AND A REPRODUCING DEVICE THEREOF

[75] Inventors: Nobuhide Sugimoto; You Yoshioka, both of Yokohama, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/903,350

[22] Filed: Jul. 30, 1997

[30] Foreign Application Priority Data

Jul. 30, 1996 [JP] Japan .................................. 8-200201
Jul. 30, 1996 [JP] Japan .................................. 8-200202

[51] Int. Cl.⁶ .................................................. G11B 13/00
[52] U.S. Cl. .............................................. 369/14; 369/58
[58] Field of Search ........................... 369/14, 58, 275.3, 369/59, 275.2, 54; 386/125, 126

[56] References Cited

U.S. PATENT DOCUMENTS

| | | | |
|---|---|---|---|
| 4,587,579 | 5/1986 | Cocke et al. | 360/75 |
| 4,609,812 | 9/1986 | Drexler | 235/487 |
| 5,592,450 | 1/1997 | Yonemitsu et al. | 369/48 |
| 5,661,703 | 8/1997 | Moribe et al. | 369/14 |
| 5,684,773 | 11/1997 | Hayashi | 369/58 |
| 5,706,266 | 1/1998 | Brownstein et al. | 369/58 |

*Primary Examiner*—Tan Dinh
*Attorney, Agent, or Firm*—Pillsbury Madison & Sutro LLP

[57] ABSTRACT

The data recorded on an optical disk is read by an optical pickup. After the thus obtained signal has been subjected to a waveform equalization process by a waveform equalizer, it is demodulated via a data slicer. A parameter for obtaining a waveform equalization characteristic best suited for reading the recorded data has been recorded on the optical disk. The demodulated parameter is decoded by a data processor. The data processor switches the waveform equalization characteristic of the waveform equalizer.

14 Claims, 20 Drawing Sheets

| MOTOR SPEED | V1 | |
|---|---|---|
| EQUALIZER'S CHARACTERISTIC | CHARACTERISTIC 1 | |
| PARAMETER JUDGMENT | 1000 | 1100 |
| | DVD1 | DVD2 |
| MOTOR SPEED | V-DVD | V-DVD |
| EQUALIZER'S CHARACTERISTIC | CHARACTERISTIC A FOR DVD1 | CHARACTERISTIC B FOR DVD2 | ns
OPTICAL RECORDING MEDIUM HAVING A PARAMETER FOR IDENTIFYING THE FORMAT OF DATA AND A REPRODUCING DEVICE THEREOF

BACKGROUND OF THE INVENTION

This invention relates to a recording medium on which digital data, such as compressed moving-picture video data, sub-video data, or audio data, has been recorded, a reproducing device for reproducing the recording medium, a data reproducing device for reproducing the data, and a data reproducing method, and more particularly to those capable of automatically controlling the reproducing condition to the best one.

As everyone knows, optical disks have been widely used in the form of compact disks (CDs) for music only or laser disks (LDs) compatible with moving-picture video.

Recently, a system has been developed which compresses moving-picture video data, audio data, and sub-video data (e.g., subtitle data) and records them with a high density. It records speech and subtitles in more than one language in advance and selects and reproduces the speech and subtitles of the desired language during reproduction. An optical disk compatible with this type of system is generally known as a DVD.

Various types of optical disks have been available. A reproducing device for reproducing such an optical disk comprises a rotary servo unit for controlling the rotation of an optical disk and an optical pickup for reading the modulated signal recorded on the optical disk by projecting a laser beam onto the signal recording surface of the optical disk and sensing the reflected light.

The signal read by the optical pickup is input to a waveform equalizer circuit, which subjects the signal to a waveform equalizing process. The waveform-equalized signal is supplied to an error correction circuit, which subjects the signal to an error correcting process. The error-corrected signal is then directed to a demodulation circuit, which demodulates the signal.

In a conventional optical disk reproducing device, the waveform equalizer circuit has a fixed characteristic. The reason is that the optical disk and the reproducing device for reproducing it are supposed to have one-to-one correspondence.

Actually, there are many types of optical disks as described above. Therefore, when an optical disk different from the expected compatible optical disk is loaded into the optical disk reproducing device and the optical disk is reproduced, the characteristic of the modulated signal obtained from the optical pickup may be very different from the characteristic of the signal to be reproduced by the reproducing device. In this case, the user may mistakenly believe that the optical disk is out of order or the optical disk is defective.

Furthermore, even when the optical disk is of the same standard, various parameters do not necessarily fulfill the standard ideally because optical disks differ from manufacturer to manufacturer or the characteristic of the optical disk reproducing device changes with time. As a result, there may be a case where an optical disk reproducing device cannot obtain an ideal modulated signal. In this case, the probability of data errors is high, making it impossible to produce a good reproduced signal.

BRIEF SUMMARY OF THE INVENTION

The object of the present invention is to provide a recording medium, a reproducing device thereof, a data reproducing device, and a data reproducing method that are capable of automatically setting the optimum characteristic according to the type of optical disk.

A recording medium according to the present invention is designed to cause part of the recorded data to include a parameter or modulated data used to obtain at least a waveform equalization characteristic to serve as a reference.

A recording medium according to the present invention has data recorded in a data recording area is reproduced by a reproducing device that includes a pickup for reading the data recorded in the data recording area, a waveform equalizer for subjecting the high-frequency modulated signal outputted from the pickup to a waveform equalization process, and a demodulation section for subjecting the output signal of the waveform equalizer to a demodulation process. A parameter indicating the recording format of the data recorded in the data recording area has been recorded in the data recording area. The waveform equalizer is designed to switch its waveform equalization characteristic on the basis of the contents of the parameter demodulated by the demodulation means.

A reproducing device according to the present invention reproduces data on a recording medium on which a parameter for obtaining at least a waveform equalization characteristic for reading the recorded data has been recorded as part of the recorded data. The reproducing device includes a pickup for reading the recorded data from the recording medium; a waveform equalizer for subjecting the high-frequency modulated signal outputted from the pickup to a waveform equalization process; a demodulation section for subjecting the output signal of the waveform equalizer to a demodulation process; and a switching section for switching the waveform equalization characteristic of the waveform equalizer on the basis of the contents of the parameter subjected to the demodulation process at the demodulation section.

A reproducing device according to the present invention reproduces data on a recording medium on which a parameter indicating the recording format of the recorded data has been recorded as part of the recorded data. The reproducing device includes a pickup for reading the recorded data from the recording medium; a waveform equalizer for subjecting the high-frequency modulated signal outputted from the pickup to a waveform equalization process; a demodulation section for subjecting the output signal of the waveform equalizer to a demodulation process; and a judging section for judging the type of the recording medium on the basis of the contents of the parameter subjected to the demodulation process at the demodulation section.

With the above configuration, when the recording medium is reproduced, the direction of control of the reproduction characteristic and the selection of the reproduction characteristic, or the type of the recording medium and its recording characteristic can be judged, which enables the optimum signal reproduction characteristic to be selected early.

A data reproducing device according to the present invention includes a waveform equalizer for subjecting the input high-frequency modulated signal to a waveform equalization process and selectively switching between a plurality of waveform equalization characteristics; a binarization section for binarizing the output signal of the waveform equalizer; an error correction section for sensing an error in the output signal of the binarization section and subjecting the signal to an error correction process; an error occurrence rate sensing section for finding information on the occurrence rate of errors sensed by the error correction section; and a switching section for switching the waveform equalization characteristic of the waveform equalizer on the basis of the error occurrence rate information obtained at the error occurrence rate sensing section.

A data reproducing method according to the present invention includes a waveform equalization step of subjecting the inputted high-frequency modulated signal to a waveform equalization process and selectively switching between a plurality of waveform equalization characteristics; a binarization step of binarizing the signal subjected to the waveform equalization process at the waveform equalization step; an error occurrence rate sensing step of sensing an error in the signal binarized in the binarization step and finding information on the error occurrence rate; and a switching step of switching the waveform equalization characteristic in the waveform equalization step on the basis of the error occurrence rate information obtained in the error occurrence rate sensing step.

With the above configuration and method, the optimum waveform equalization characteristic can be obtained according to the error occurrence rate of the input data, which improves the data reproducing capability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
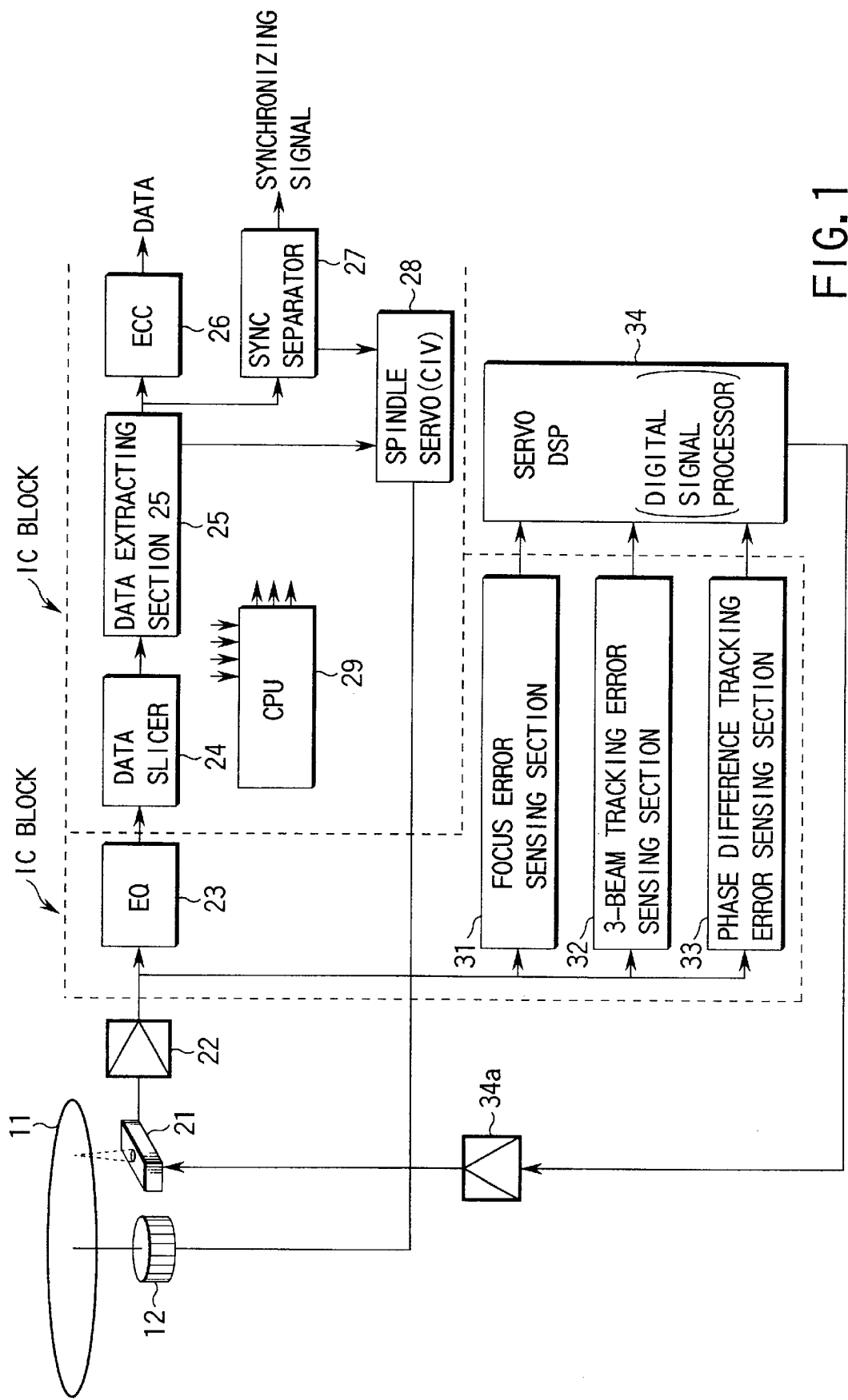
FIG. 1 is a block diagram of an optical disk reproducing device according to a first embodiment of the present invention.

Hereinafter, referring to the accompanying drawings, a first embodiment of the present invention will be described. FIG. 1 shows the entire configuration of an optical disk reproducing device, which will be explained in the first embodiment. In FIG. 1, numeral 11 indicates an optical disk, which is rotated by a disk motor 12. On the signal recording side of the optical disk 11, an optical pickup 21 is provided. The optical pickup 21 is moved by a pickup transport motor (not shown) in the direction of the radius of the optical disk 11.

The high-frequency modulated signal output from the optical pickup 21 is input via a preamplifier 22 to a waveform equalizer 23, which subjects the signal to a waveform equalizing process. The waveform-equalized modulated signal is input to a data slicer 24, which binarizes the signal. The binarized signal is supplied to a data extracting section 25. The data extracting section 25 includes a data synchronizing clock generator using a phase locked loop (PLL) circuit.

Thus, the data extracting section 25 not only generates a data clock but also samples the modulated signal using the data clock. This causes the data extracting section 25 to extract the digital data recorded on the optical disk 11. The extracted digital data is supplied to an error correction circuit (ECC) 26 and a sync separator 27 for separating the synchronizing signal.

The data clock reproduced at the data extracting section 25 and the synchronizing signal obtained at the sync separator 27 are inputted to a spindle servo circuit 28. The spindle servo circuit 28 takes in the synchronizing signal synchronized with the data clock and controls the rotational speed of the disk motor 12 on the basis of the frequency and phase of the synchronizing signal. In this case, the spindle servo circuit 28 controls the rotational speed of the disk motor 12 so that it can get a synchronizing signal of a specific frequency from the sync separator 27, while performing a usual reproduction.

In FIG. 1, numeral 29 indicates a data processor, which carries out the control of the slice level of the data slicer 24, the change of the characteristic of the PLL circuit in the data extracting section 25, the change of the operation timing of the spindle servo circuit 28 and sync separator 27, and the output control of the error correction circuit 26. The data processor 29 controls the characteristic of the waveform equalizer 23 as described later.

The optical disk reproducing device is further provided with pickup servo means for the optical pickup 21. The pickup servo means comprises a focus error sensing section 31, a 3-beam tracking error sensing section 32, a phase difference tracking error sensing section 33, and a servo signal processing section 34 for processing the error signals generated at these sensing sections 31, 32, 33 and thereby producing control signals to correct errors in the respective signals. The control signals obtained from the servo signal processing section 34 are supplied to the optical pickup 21 via an amplifier 34a.

Figure 2:
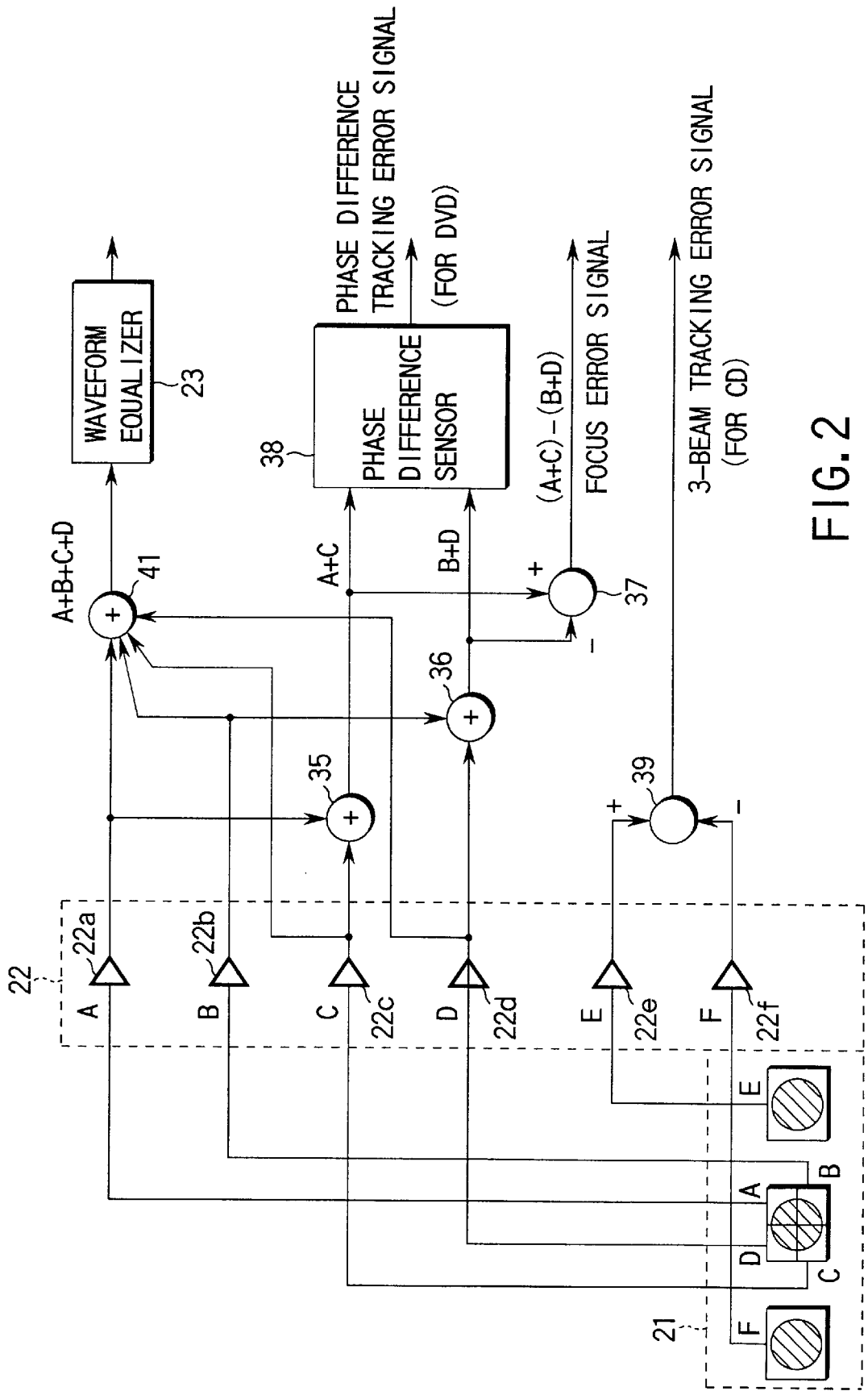
FIG. 2 is a block diagram of a pickup servo means according to the first embodiment.

FIG. 2 shows the configuration of the focus error sensing section 31, 3-beam tracking error sensing section 32, and phase-difference tracking error sensing section 33 that form the pickup servo means. Namely, FIG. 2 shows the arrangement of photodetectors A to F of the optical sensor section of the optical pickup 21, the inside of the preamplifier 22, and the respective error sensor sections 31, 32, 33.

In the embodiment, the optical sensing section is made up of 4-quadrant photodetectors A, B, C, D and two photodetectors E, F located before and after them. Ideally, the central reflected beam is received equally by the light-receiving surfaces of the respective 4-quadrant photodetectors A, B, C, D. In a good tracking state, the front and back photodetectors E, F receive the corresponding reflected beams equally.

The outputs of the photodetectors A to F are directed to buffer amplifiers 22a to 22f, respectively. The outputs A, C of the buffer amplifiers 22a, 22c are added at an adder 35, which then produces an (A+C) signal. The outputs B, D of the buffer amplifiers 22b, 22d are added at an adder 36, which then produces an (B+D) signal.

Then, the outputs of the adders 35, 36 are input to a subtracter 37, which performs the operation of (A+C)−(B+D) to produce a focus error signal. The focus error signal is input to an S-character level sensing circuit (not shown) provided in the focus error sensing section 31, which uses the signal for sensing the focus state. The sensing operation will be explained later.

The outputs of the adders 35, 36 are input to a phase difference sensor 38. The phase difference sensor 38 senses the phase difference between the (A+C) signal and the (B+D) signal. The sensed signal is used as a phase difference tracking error signal. The phase difference tracking error signal is used as an effective signal in reproducing a DVD.

The outputs of the buffer amplifiers 22e, 22f undergo a subtraction process at a subtracter 39, which then produces an (E−F) signal. The (E−F) signal is used as a 3-beam tracking error signal. The 3-beam tracking error signal is used as an effective signal in reproducing a CD.

The outputs of the buffer amplifiers 22a, 22b, 22c, 22d undergo an addition process at an adder 41, which then produces an (A+B+C+D) signal. The (A+B+C+D) signal is supplied to the waveform equalizer 23 as an RF (radio frequency) signal.

Figure 3:
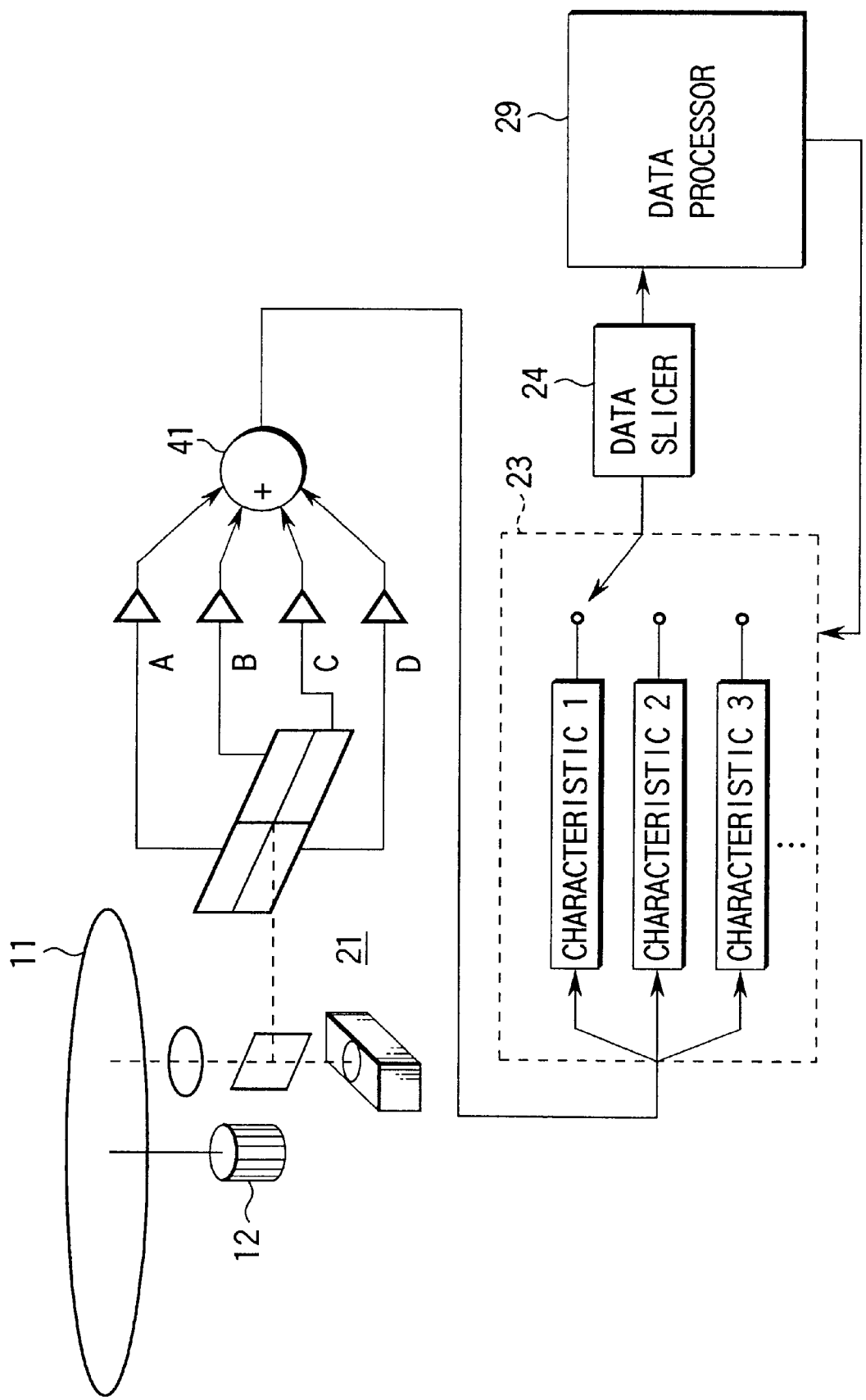
FIG. 3 is a block diagram of the characteristic selection portion of the first embodiment.

FIG. 3 shows one of the characteristic sections of the present invention. In FIG. 3, the same parts as those in FIGS. 1 and 2 are indicated by the same reference symbols. The outputs of the 4-quadrant photodetectors A, B, C, D of the optical pickup 21 are added at the adder 41, which inputs the addition result to the waveform equalizer 23. The waveform equalizer 23 can switch between at least two waveform equalization characteristics. The switching of waveform equalization characteristics is realized by switching between delay characteristics or amplitude characteristics, or between both of these characteristics. In FIG. 3, characteristic 1, characteristic 2, characteristic 3, etc . . . after switching are shown.

Regarding the switching of waveform equalization characteristics, the best characteristic is selected by causing the data processor 29 to judge the data from the data slicer 24 or the reproduced data after error correction.

Figures 4A, 4B:
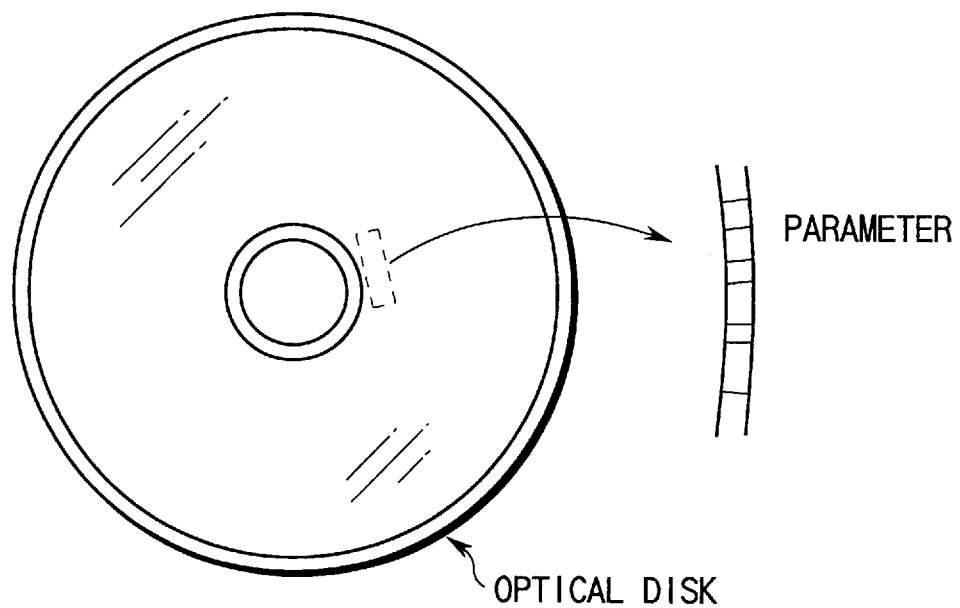
FIGS. 4A and 4B are drawings to help explain an example of the operation of the first embodiment.

Means for selecting the best characteristic include various embodiments as described below. FIG. 4A is a drawing to help explain the operation of selecting the best characteristic. First, when the optical disk reproducing device starts to reproduce an optical disk 11, the optical pickup 21 is moved to a specific position and the number or revolutions of the disk motor 12 is automatically set at a specific speed.

The waveform equalization characteristic of the waveform equalizer 23 is also set to a specific characteristic. Moreover, the optical system of the optical pickup 21 and the beam are set to the respective specific characteristics. The data sampling clock in the data processor 29 is also set at a specific frequency.

There is an agreement between the optical disk 11 and the optical disk reproducing device. Specifically, the optical disk 11 is provided with a recording area (e.g., a lead-in area) from which the signal can be read, regardless of the type of the optical disk 11 [e.g., DVD1 (single layer structure) or DVD2 (double layer structure)], provided that the disk is rotated at a specific speed and is set to a specific waveform equalization characteristic and a specific beam characteristic, and on which a parameter indicating the type of the optical disk 11 has been recorded (see FIG. 4B).

Then, if the parameter or modulated data read from the area is the repetition of "1000," for example, the data processor 29 will judge that the optical disk 11 loaded is a DVD1 (single layer structure). If the parameter is the repetition of "1100," the data processor 29 will judge that the optical disk 11 is a DVD2 (double layer structure). The data processor 29 may be judge that the optical disk 11 is DVD2, if the parameter is the repetition of "1100", otherwise it may judge that the optical disk 11 is DVD1.

As described above, the data processor 29 can judge whether the optical disk 11 being reproduced is a DVD1 or a DVD2. This enables the data processor 29 to set the rotational speed of the disk motor 12 at a speed suitable for the optical disk 11 loaded. The data processor 29 can switch the internal characteristic of the waveform equalizer 23 to the characteristic for DVD1s or DVD2s.

The parameter may be a concrete parameter indicating the relationship between the recording bit clock frequency of the recorded data and the spatial frequency at the time when the pickup 21 reads the recorded data, such as their ratio. In this case, the data processor 29 is programmed to automatically set the characteristic of each section, including the optical system and the signal processing system, according to the contents of the parameter.

For example, DVD-ROMs or DVD-Rs are available in two types in terms of data recording density: those with a linear density of 0.267 $\mu$m/bit and those with a linear density of 0.293 $\mu$m/bit. On a DVD with a linear density of 0.267 $\mu$m/bit, the parameter "0000" is recorded. On a DVD with a linear density of 0.293 $\mu$m/bit, the parameter "0001" is recorded.

For this reason, when the read-out parameter is "0000," the data processor 29 will judge that the DVD is a DVD with a linear density of 0.267 $\mu$m/bit. When the read-out parameter is "0001," the data processor 29 will judge that the DVD is a DVD with a linear density of 0.293 $\mu$m/bit. In this way, the data processor automatically switches the characteristic of each section, including the optical system and the signal processing system. Moreover, some DVD-RAMs have a linear density ranging from 0.409 to 0.435 $\mu$m/bit in forms of data recording density. The parameter "0010" is recorded to represent the density. As described above, the linear density of the DVD-RAMs range within a scope of 0.409–0.435 μm/bit. This is because, DVD-RAMs are driven in accordance with ZCLV (Zone Constant Linear Velocity) method.

Figure 5A:
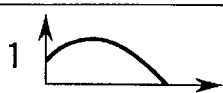
FIGS. 5A and 5B are drawings to help explain another example of the operation of the first embodiment.
Figure 5B:
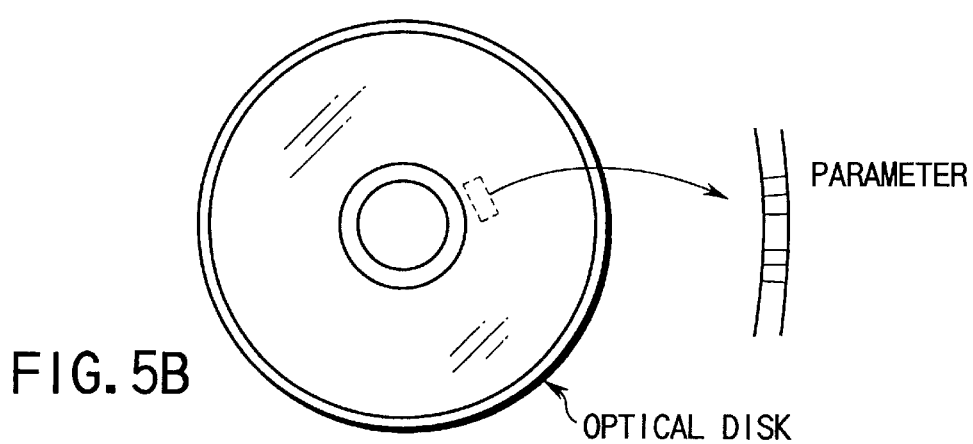

FIGS. 5A and 5B show an example of the expansion of the first embodiment. When the type of the optical disk 11 has been judged, the data processor 29 can set the rotational speed of the disk motor 12 to a speed suitable for the optical disk 11 loaded, as described earlier. The data processor 29 can further switch the internal characteristic of the waveform equalizer 23 to the characteristic for DVD1s or DVD2s.

In this example, after the characteristic of each section has been set to the characteristic corresponding to the optical disk 11 being reproduced, the characteristic of the waveform equalizer 23 is adjusted minutely. In a first example, the characteristic of the waveform equalizer 23 is changed minutely from a1 to a2, a3, . . . , in this order to search for a characteristic that produces the highest reproduction level, for example. Then, for example, if the highest reproduction level has been obtained with characteristic a2, characteristic a2 will be used as the characteristic of the waveform equalizer 23. Although FIG. 5A shows the switching of the characteristic only in the DVD1 column, the same is true for the case where a DVD2 is reproduced.

In a second example, for example, a plurality of parameters for obtaining more minute waveform equalization characteristics are recorded in part of the recorded data on a DVD2. By judging the contents of the best read one of the parameters, the waveform equalization characteristic corresponding to the contents is set.

For example, three parameters X1, X2, X3 differing minutely in the frequency of bit clock have been recorded on a disk. The parameter read with less noise in the best condition with the once-set waveform equalization characteristic indicates the contents specifying how to set the normal waveform equalization characteristic.

Specifically, when parameter X2 has been read properly, the currently set waveform equalization characteristic is determined to be the best. When parameter X1 has been read properly, the currently set waveform equalization characteristic is determined to be shifted from the normal waveform equalization characteristic toward the high frequency side (upward) on the frequency axis. Similarly, when parameter X3 has been read properly, the currently set waveform equalization characteristic is determined to be shifted from the normal waveform equalization characteristic toward the low frequency side (downward) on the frequency axis.

Therefore, parameter X1 includes a command to adjust the current waveform equalization characteristic toward the low frequency side. Parameter X3 includes a command to adjust the current waveform equalization characteristic toward the high frequency side.

In the above explanation, it is assumed that after the type of the optical disk 11 has been judged, a waveform equalization characteristic is judged minutely and then the characteristic is adjusted. In the case of an optical disk reproducing device into which, for example, a DVD2 is supposed to be loaded from the beginning, the process in the second example can be executed immediately.

Specifically, for example, a plurality of parameters to get more detailed waveform equalization characteristics are recorded in part of the recorded data on the DVD2. Then, the contents of the best read one of the parameters are judged and the waveform equalization characteristic corresponding to the contents is set.

With a system comprising such an optical disk 11 and a reproducing device for the disk, recording not only parameters for setting waveform equalization characteristics but also parameters for switching the characteristic of each section on the optical disk 11 enables the reproducing device to switch between the individual sections using the parameters. In this case, the compensation amplifier and the signal processing mode are switched.

In the first embodiment, the parameters have been recorded on the optical disk 11 itself. When the parameters are read and decoded, this produces the setting data for setting the reproduction characteristic best suited for the optical disk 11.

Figure 6A:
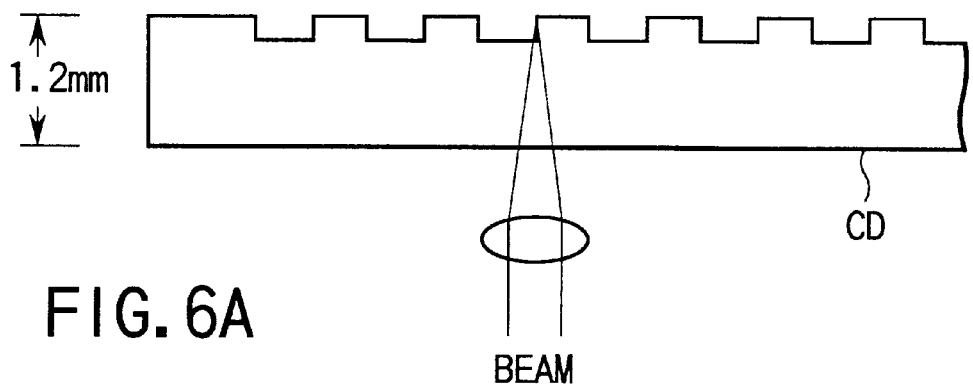
FIGS. 6A to 6C are sectional views of various types of optical disks.
Figure 6B:
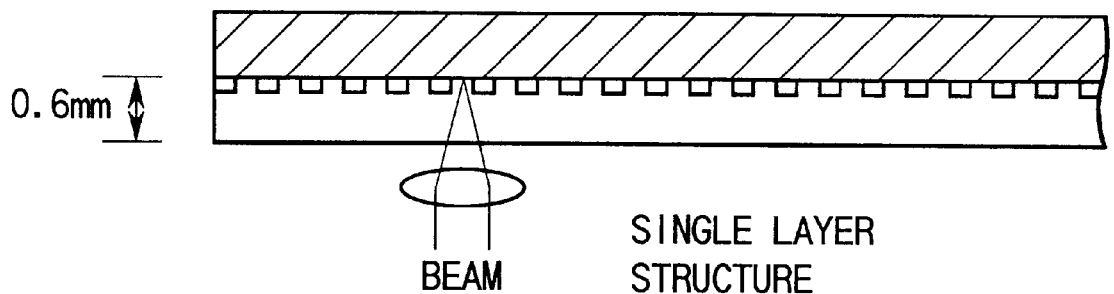
Figure 6C:
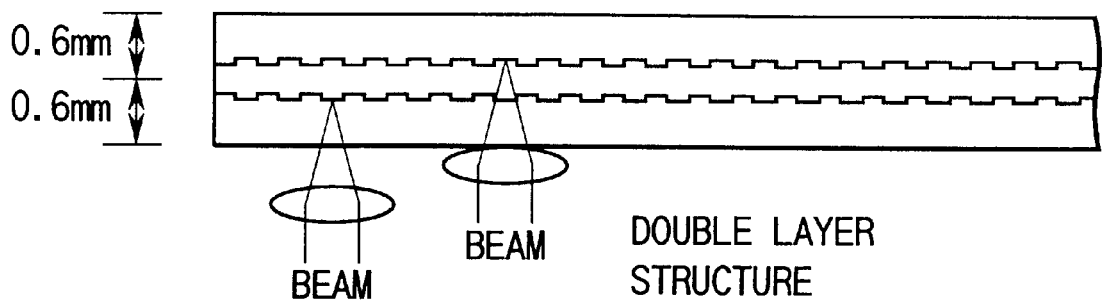

The structure of optical disks 11 currently available in various types will be explained. FIGS. 6A to 6C are sectional view of various optical disks 11. First, FIG. 6A shows a conventional CD for music use of 1.2 mm thickness.

FIGS. 6B and 6C illustrate DVDs on which data-compressed video codes and audio codes have been recorded with a high recording density. They include ultra-high density optical disks. Namely, there are DVD-ROMs (read-only memories) for reproduction only and DVD-RAMs (read after memories).

FIG. 6B shows a DVD with a single-layer structure composed of a single signal-recording-surface-formed substrate. FIG. 6C shows a DVD-ROM with a double-layer structure composed of two signal-recording-surface-formed substrates laminated together. In both cases, the thickness of the entire optical disk 11 is 1.2 mm and the thickness of the substrate is determined to be 0.6 mm. The diameter of both of the CD and DVD is 12 cm or 8 cm.

Figure 7A:
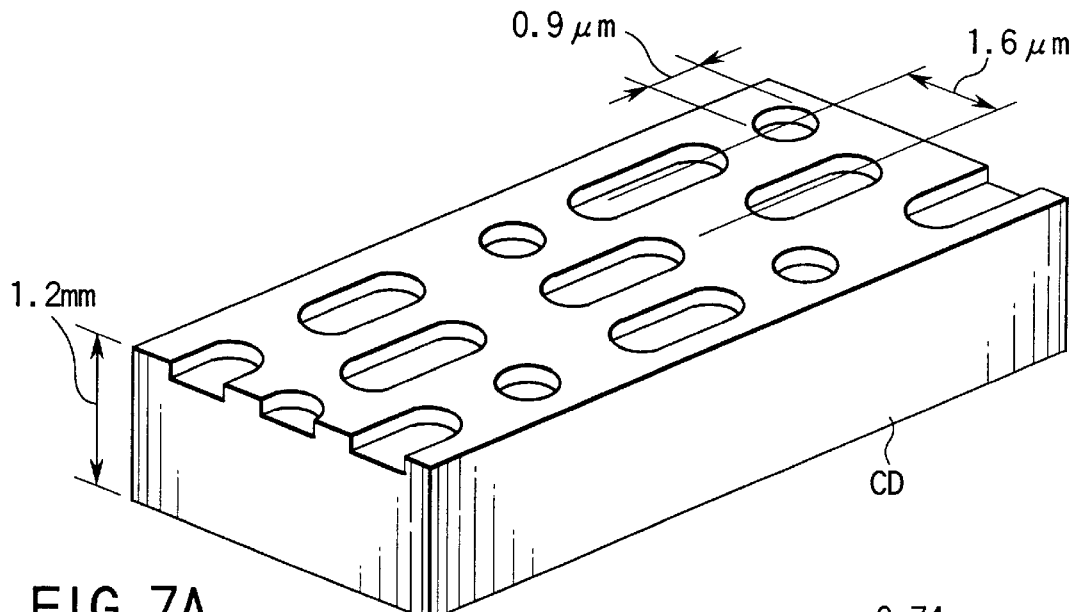
FIGS. 7A to 7C are enlarged perspective views of the signal recording surface of various types of optical disks.
Figure 7B:
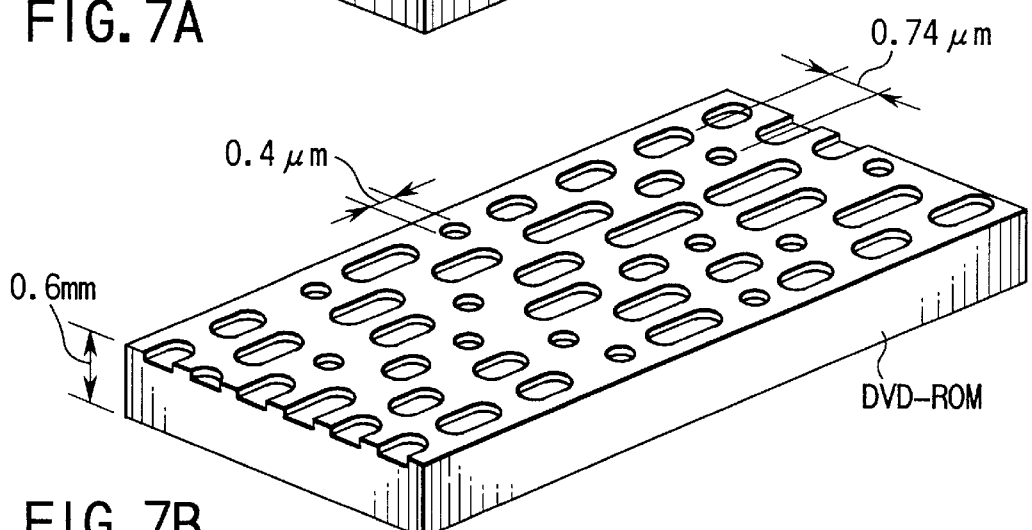
Figure 7C:
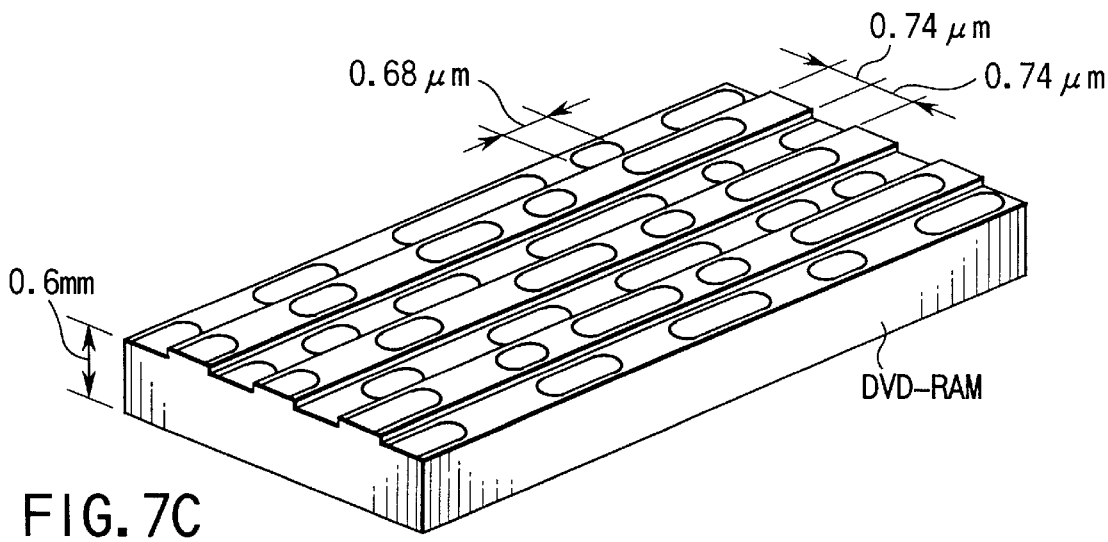

FIGS. 7A to 7C are enlarged views of the signal recording surface of the optical disks 11 in FIGS. 6A–6C. FIG. 7A shows the structure of the signal recording surface of a CD. FIG. 7B shows the structure of the signal recording surface of a DVD-ROM. FIG. 7C shows the structure of the signal recording surface of a DVD-RAM.

FIGS. 7A to 7C show the thickness, pit width, and track width of the disk substrate. As seen from the figures, the optical disks 11 differ in track pitch or in recording format.

Figure 8:
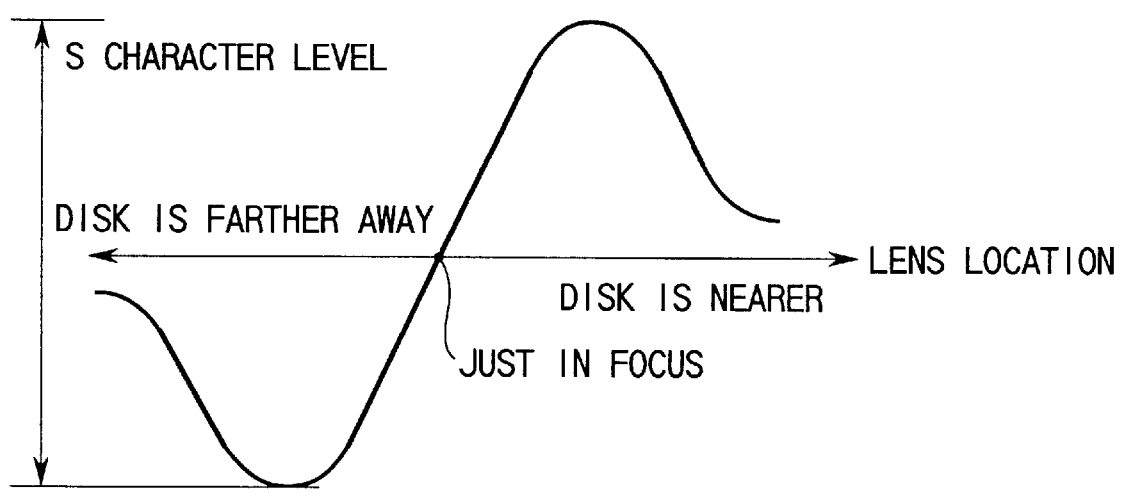
FIG. 8 is a diagram showing the variations in the level of the focus error signal.

An explanation of a focus servo operation will be given. The focus error signal is supplied to the S-character level sensing circuit in the focus error sensing section 31. The S-character level sensing circuit senses that the level of the focus error signal changes as shown in FIG. 8 according to the focus state.

The level information sensed at the S-character level sensing circuit is input to the servo signal processing section 34. The servo signal processing section 34 causes the optical system of the optical pickup 21 to carry out a focus servo operation based on the input level information.

The S-character sensed level information can be used to determine the type of the optical disk 11. In this case, after the type of the optical disk 11 has been determined based on the S-character sensed level information, a final confirmation can be made according to the aforementioned parameters.

Specifically, determination of the type of optical disk 11 based on the S-character sensed level information is based on the fact that the reflectivity of a projected light beam of an optical disk 11 as a single-layer CD or DVD differs from that of an optical disk 11 as a two-layer DVD-ROM or DVD-RAM.

Specifically, an optical disk 11 as a single-layer CD or DVD has a light beam's reflectivity of about 60 to 70%. An optical disk 11 as a double-layer DVD-ROM has a light beam's reflectivity of about 25 to 30%. An optical disk 11 as a double-layer DVD-RAM has a light beam's reflectivity of 20% or less.

Therefore, for example, when the focus error signal is high, it is determined that an optical disk 11 as a single-layer CD or DVD has been loaded. When the focus error signal is low, it is determined that such an optical disk 11 as a double-layer DVD-ROM or DVD-RAM has been loaded.

Whether a single-layer optical disk 11 or a double-layer optical disk 11 is used can be judged by bringing an object lens (not shown) built in the optical pickup 21 gradually closer to the optical disk 11 and using the number of times that the in-focus point judged from the focus error signal has been reached.

When a judgment is made by this approach, it is desirable that the optical disk 11 is stopped or forced to rotate slowly half a turn or a full turn without using the rotary servo system. The reason is that using the rotary servo system may give rise to a runaway.

It is preferable to use the smallest number of revolutions in providing CLV (constant linear velocity) control of the rotational speed of the optical disk 11 or the smallest number of revolutions of an expected optical disk 11 as the rotational speed in slowly rotating the optical disk 11 at a constant speed. Such a method of controlling the rotational speed is also carried out when a tracking error signal, explained later, is used to determine the type of the optical disk 11.

Figure 9:
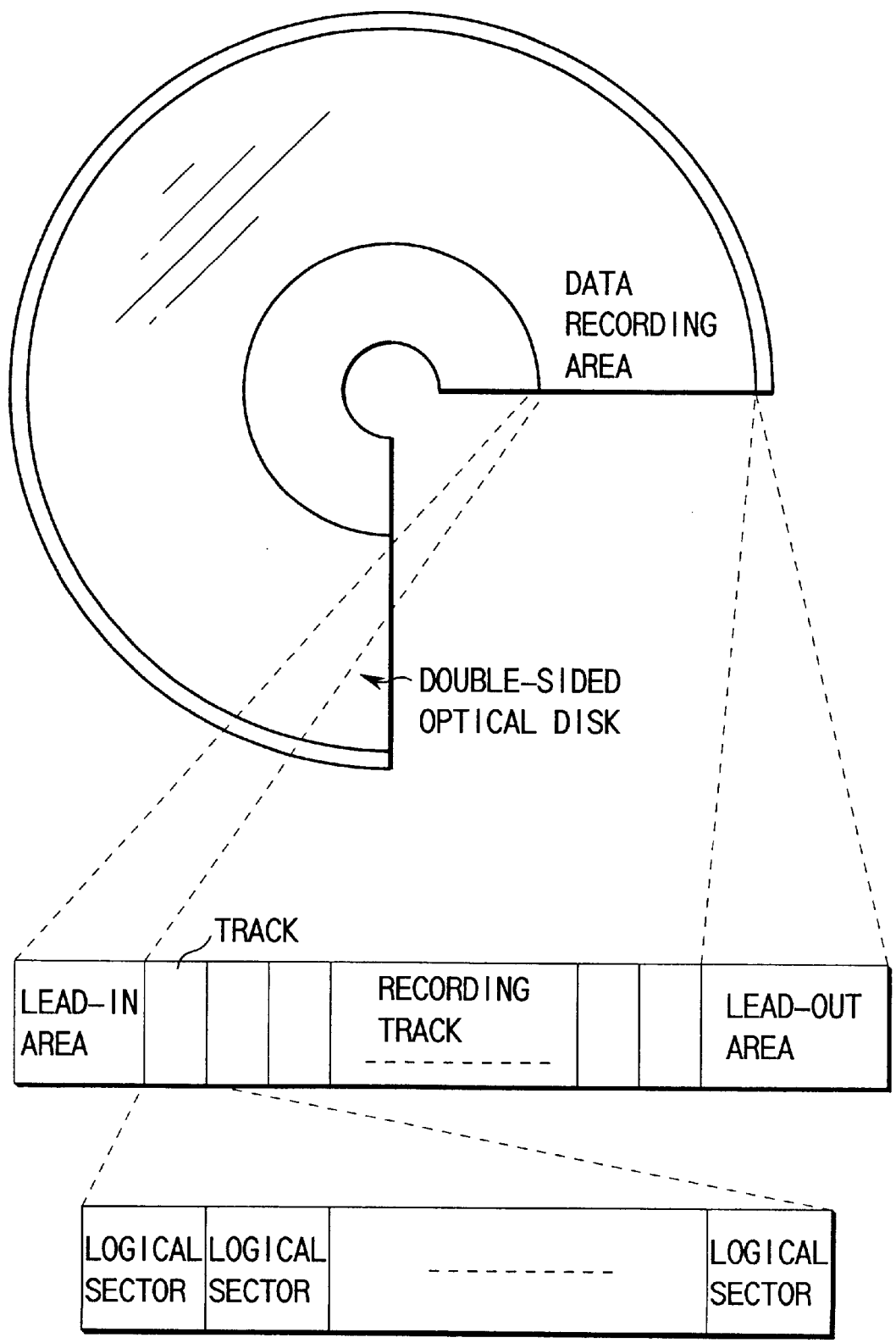
FIG. 9 shows the recording data structure of an optical disk as a recording medium to which the present invention is applied.

FIG. 9 shows the recorded data structure on the optical disk 11 as an example of a recording medium to which the present invention has been applied. The optical disk 11 is a double-sided laminated disk having a memory capacity of about 5 gigabytes on one side. A large number of recording tracks are arranged between the lead-in area on the inner periphery side and the lead-out area on the outer periphery side. Each track is composed of a large number of logical sectors. In each sector, various types of information (compressed digital data) have been stored.

Figure 10:
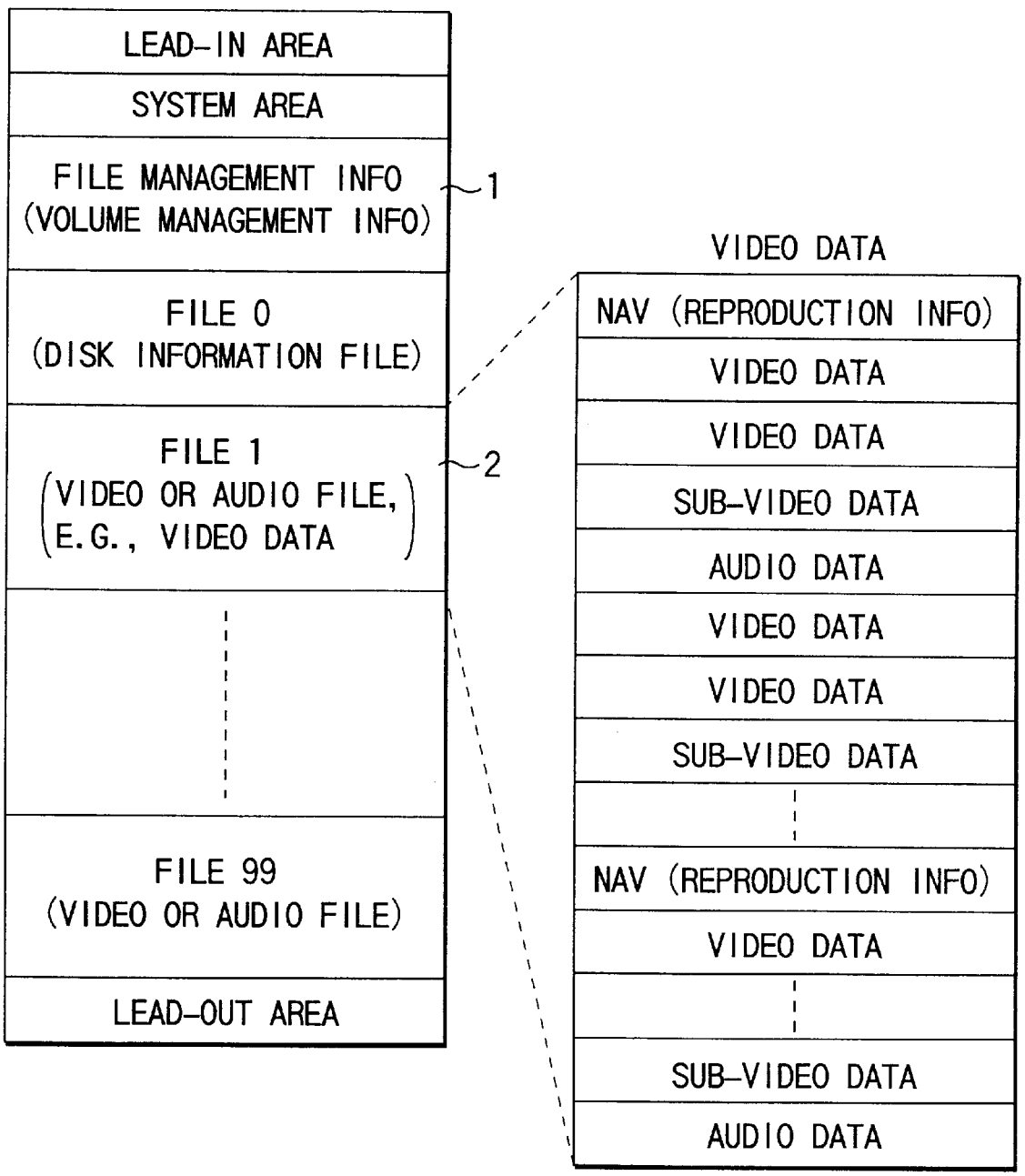
FIG. 10 shows the logic structure of the data recorded on the optical disk.

FIG. 10 shows the data structure of a video file recorded on the optical disk 11 of FIG. 9. As shown in FIG. 10, the video file includes file management information 1 and video data 2. The video data 2 has a video data unit (block), an audio data unit (block), a sub-video data unit (block), and an NAV unit (block) on which the necessary information NAV (including DSI (data search information) and PCI (picture control information) for controlling the data reproduction has been recorded.

Each unit is divided into packets of a constant data size for each type of data, for example. The video data unit, audio data unit, and sub-video data unit are reproduced in synchronization with each other based on the NAV placed immediately before these unit groups.

Specifically, a system area for storing the system data used to reproduce the optical disk 11, a volume management information area, and a plurality of file areas are formed in a set of logical sectors shown in FIG. 9.

Of the file areas, for example, as shown in FIG. 10, file 1 includes main video information (video data in the figure), sub-video information (sub-video data in the figure) having the auxiliary contents for the main video, audio information (audio data in the figure), and reproduction information.

Because the NAV unit has room for recording data (reserve section), new parameters can be written in the reserved section. Since the NAV unit has been written in a plurality of places (the outer periphery side and the inner periphery side) on the optical disk 11, it is possible to provide several checkpoints and write various parameters for system checkup in the NAV units at these checkpoints.

The parameters may be not only those specifying the waveform equalization characteristic but also information for controlling the rotational speed of the disk motor 12. Use of these parameters enables the reproduction condition of the optical disk reproducing device to be set to the best one according to the optical disk 11.

With the first embodiment, because the reproduction output state of at least the modulated signal recorded on the optical disk 11 is identifiable, the type of the optical disk 11 can be identified. When the modulated signal recorded on the optical disk 11 is read, at least the reproduction characteristic of the modulated signal can be brought closer to an ideal characteristic and the resulting characteristic can be obtained. Furthermore, use of the parameters on the optical disk 11 enables the reproduction condition of the optical disk reproducing device to be maintained in the best one.

Figure 11:
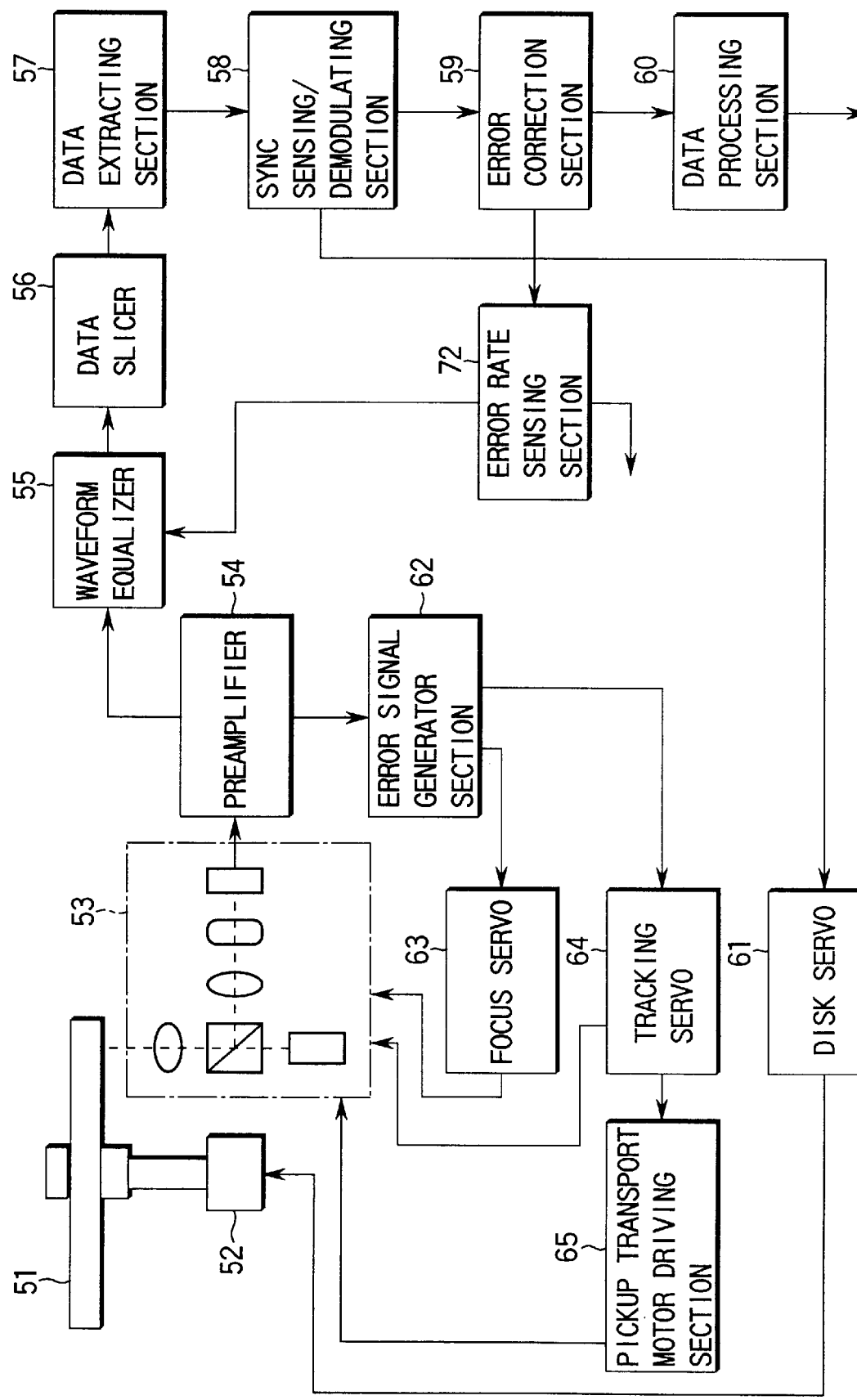
FIG. 11 is a block diagram of an optical disk reproducing device according to a second embodiment of the present invention.

Next, a second embodiment of the present invention will be explained. In FIG. 11, numeral 51 indicates an optical disk, which is rotated by a disk motor 52. On the signal recording side of the optical disk 51, an optical pickup 53 is provided. The optical pickup 53 is moved by a pickup transport motor (not shown) in the direction of the radius of the optical disk 51.

The high-frequency modulated signal output from the optical pickup 53 is input via a preamplifier 54 to a waveform equalizer 55, which subjects the signal to a waveform equalizing process. The waveform-equalized modulated signal is input to a data slicer 56, which binarizes the signal. The binarized signal is supplied to a data extracting section 57. The data extracting section 57 includes a data synchronizing clock generator using a phase synchronous loop (PLL) circuit.

Thus, the data extracting section 57 not only generates a data clock but also samples the modulated signal using the data clock. This causes the data extracting section 57 to extract the digital data recorded on the optical disk 51. The extracted digital data is supplied to an error correction circuit (ECC), a sync separator 27 for separating the synchronizing signal, and a sync sensing/demodulating section 58 including a demodulator for converting the modulated signal into the original bit string.

The output of the sync sensing/demodulating section 58 is input to an error correction section 59, which performs an error correction process by a specific method. The serial data subjected to the error correction process is input to a data processing section 60, which subjects the serial data to a data separating process and a decoding process.

The data clock in the data processing section 60 and the synchronizing signal in the sync sensing/demodulating section 58 are input to a disk servo circuit 61. The disk servo circuit 61 takes in the synchronizing signal synchronized with the data clock and controls the rotational speed of the disk motor 52 based on the frequency and phase of the synchronizing signal. Then, the disk servo circuit 61 controls the rotational speed of the disk motor 52 so that it can get a synchronizing signal having a specific frequency and phase while a normal reproduction.

The output of the preamplifier 54 is input to an error signal generator section 62. As described later, the error signal generator section 62 uses the output signal from a photoelectric conversion element built in the optical pickup 53 to generate a focus error signal, phase-difference tracking error signal, and 3-beam tracking error signal compatible with a focus servo, a phase-difference tracking servo, and a 3-beam tracking servo, respectively.

The focus error signal is supplied to a focus servo circuit 63. The phase-difference tracking error signal and 3-beam tracking error signal are inputted to a tracking servo circuit 64. The output of the focus servo circuit 63 is supplied to the focus driving section of the optical pickup 52. The output of the tracking servo circuit 64 is supplied to not only the tracking driving section of the optical pickup 53 but also a pickup transport motor driving section 65.

The pickup transport motor moves the optical pickup 53 in the direction of the radius of the optical disk 51 and is driven in supplementing tracking control or in a jump operation. A disk type judging circuit (not shown) supplies an NA change signal for changing the numerical aperture (NA).

The NA change signal is used to change the lens, when the optical pickup 53 is provided with two optical lens systems. When the optical pickup is a stop change type, the NA change signal is used to change the aperture stop. When the optical pickup 53 two focal points in the direction of the optical axis, no change is needed.

Figure 12:
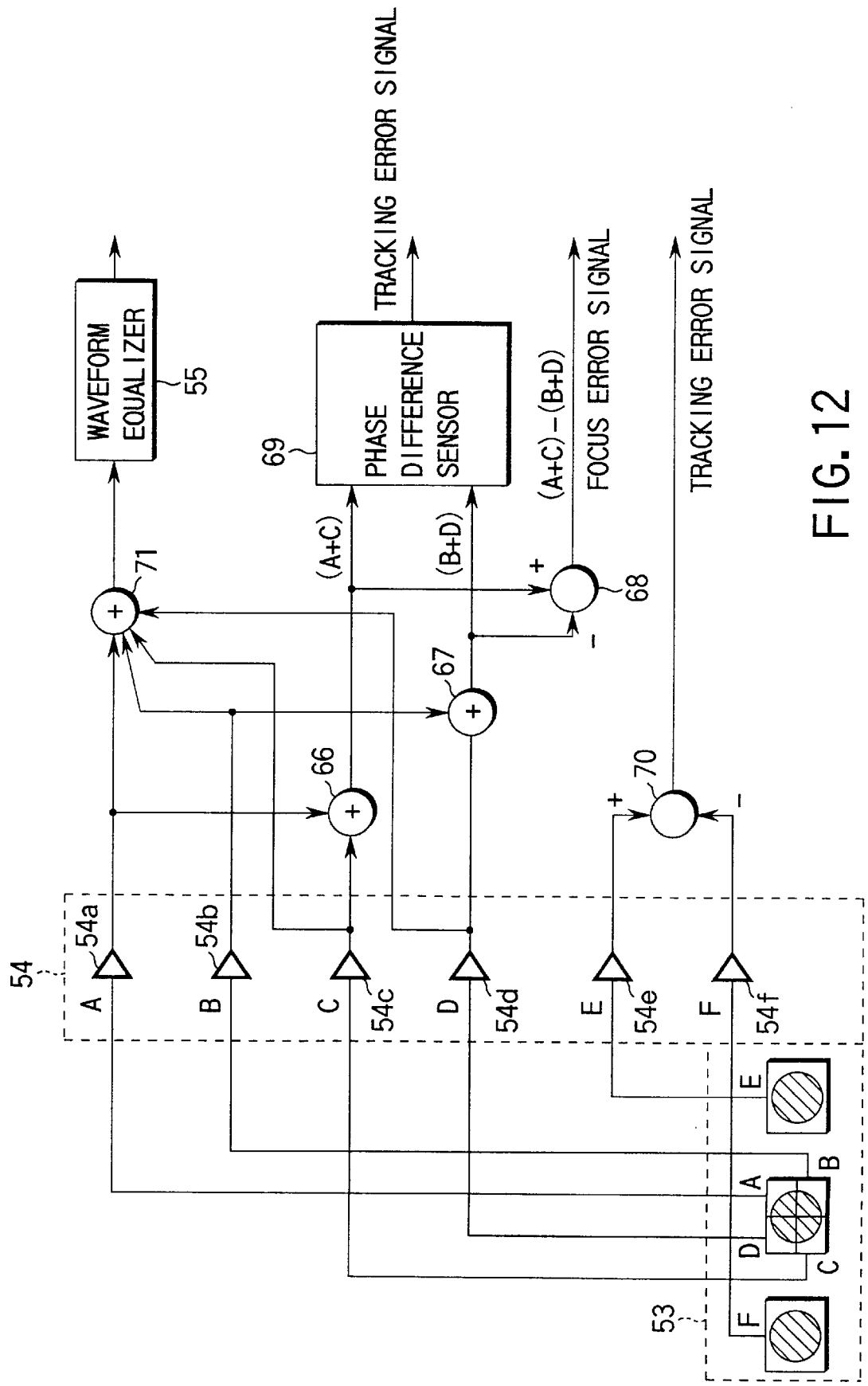
FIG. 12 is a detailed block diagram of the optical pickup, preamplifier, and error signal generator section in the second embodiment.

FIG. 12 shows the configuration of the photoelectric conversion element and the error signal generator section 62 for generating a focus error signal, a phase-difference tracking error signal, and a 3-beam tracking error signal. Namely, FIG. 12 shows the arrangement of photodetectors A to F serving as the photoelectric conversion elements of the optical pickup 53, the inside of the preamplifier 54, and the inside of the error signal generator section 62.

In the second embodiment, the photoelectric conversion element is made up of 4-quadrant photodetectors A, B, C, D and two photodetectors E, F located before and after them. Ideally, the central reflected beam is received equally by the light-receiving surfaces of the respective 4-quadrant photodetectors A, B, C, D. In a good tracking state, the front and back photodetectors E, F receive the corresponding reflected beams equally.

The outputs of the photodetectors A to F are directed to buffer amplifiers 54a to 54f, respectively. The outputs A, C of the buffer amplifiers 54a, 54c are added at an adder 66, which then produces an (A+C) signal. The outputs B, D of the buffer amplifiers 54b, 54d are added at an adder 67, which then produces an (B+D) signal.

Then, the outputs of the adders 66, 67 are input to a subtracter 68, which performs the operation of (A+C)–(B+D) to produce a focus error signal. The focus error signal is input to an S-character level sensing circuit (not shown) provided in the focus servo circuit 63, which uses the signal for sensing the focus state.

The outputs of the adders 66, 67 are input to a phase difference sensor 69. The phase difference sensor 69 senses the phase difference between the (A+C) signal and the (B+D) signal. The sensed signal is used as a phase difference tracking error signal. The phase difference tracking error signal is used as an effective signal in reproducing a DVD.

The outputs of the buffer amplifiers 54e, 54f undergo a subtraction process at a subtracter 70, which then produces an (E–F) signal. The (E–F) signal is used as a 3-beam tracking error signal. The 3-beam tracking error signal is used as an effective signal in reproducing a CD.

The outputs of the buffer amplifiers 54a, 54b, 54c, 54d undergo an addition process at an adder 42, which then produces an (A+B+C+D) signal. The (A+B+C+D) signal is supplied to the waveform equalizer 55 as an RF signal.

In FIG. 11, the error occurrence situation in the error correction section 59 is being monitored by an error rate sensing section 72. The error rate sensing section 72 switches the waveform equalization characteristic of the waveform equalizer 55 according to the sensed error rate. The error rate sensed at the error rate sensing section 72 is also used to switch the characteristic of another section.

Figure 13:
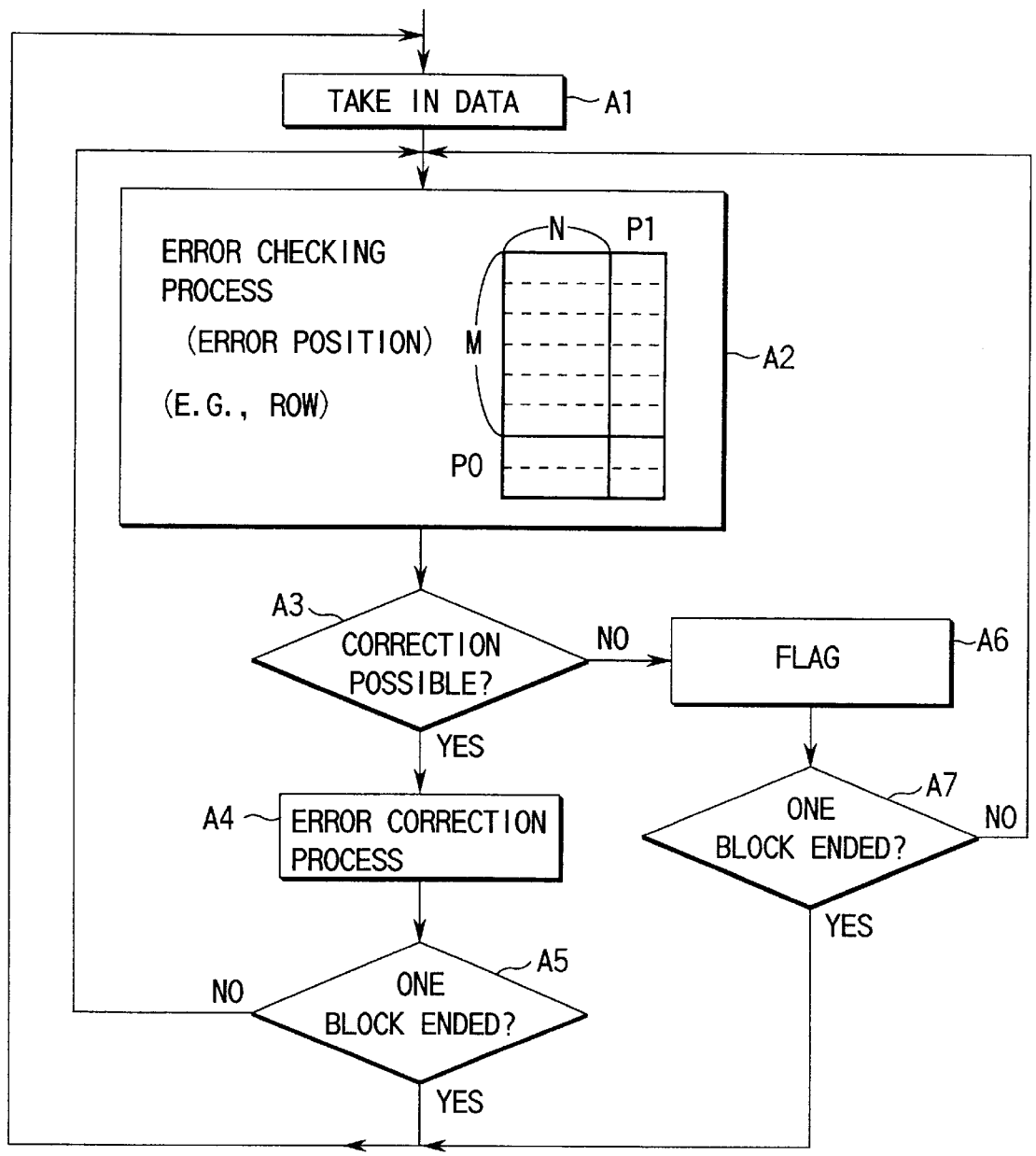
FIG. 13 is a flowchart of the operation of the error correction section in the second embodiment.

FIG. 13 shows the process in the error correction section 59. The error correction section 59 first takes in one frame (one block) of data in the demodulated signal on the basis of the synchronizing signal (step A1) and executes an error checking process row by row using error check words. After having completed the error checking process of all the rows, the error correction section executes the error checking process of each column (step A2). By doing this, the error correction section 59 gets information on the number of error occurrences and the position of errors.

If being able to correct errors, the error correction section 59 performs the error correction process (steps A3, A4) and judges whether or not all of one block of data used as a unit of correction has been subjected to the error correction process (step A5). If all of one block of data has not been subjected to the error correction process, error sensing and correction will be executed for the next row or column. If all of one block of data has been subjected to error sensing and correction, the error correction section takes in the next block of data.

If at step A3, error correction is impossible, the error correction section 59 writes a flag that corresponds to the row or column for which error correction has been judged to be impossible (step A6). The flag is stored in a management memory. Then, whether or not the checking of one block of data has been finished is judged (step A7). If the checking has been completed, the error correction section 59 takes in the next block of data. If the checking has not been ended, the error correction section starts the checking process of the next row or column.

As described above, errors are checked and corrected block by block. The number of flags and the positions of errors (the number of errors) have been monitored by the error rate sensing section 72. The error rate sensed by the error rate sensing section 72 is used to control the switching of the characteristic of each section of the optical disk reproducing device.

Figure 14:
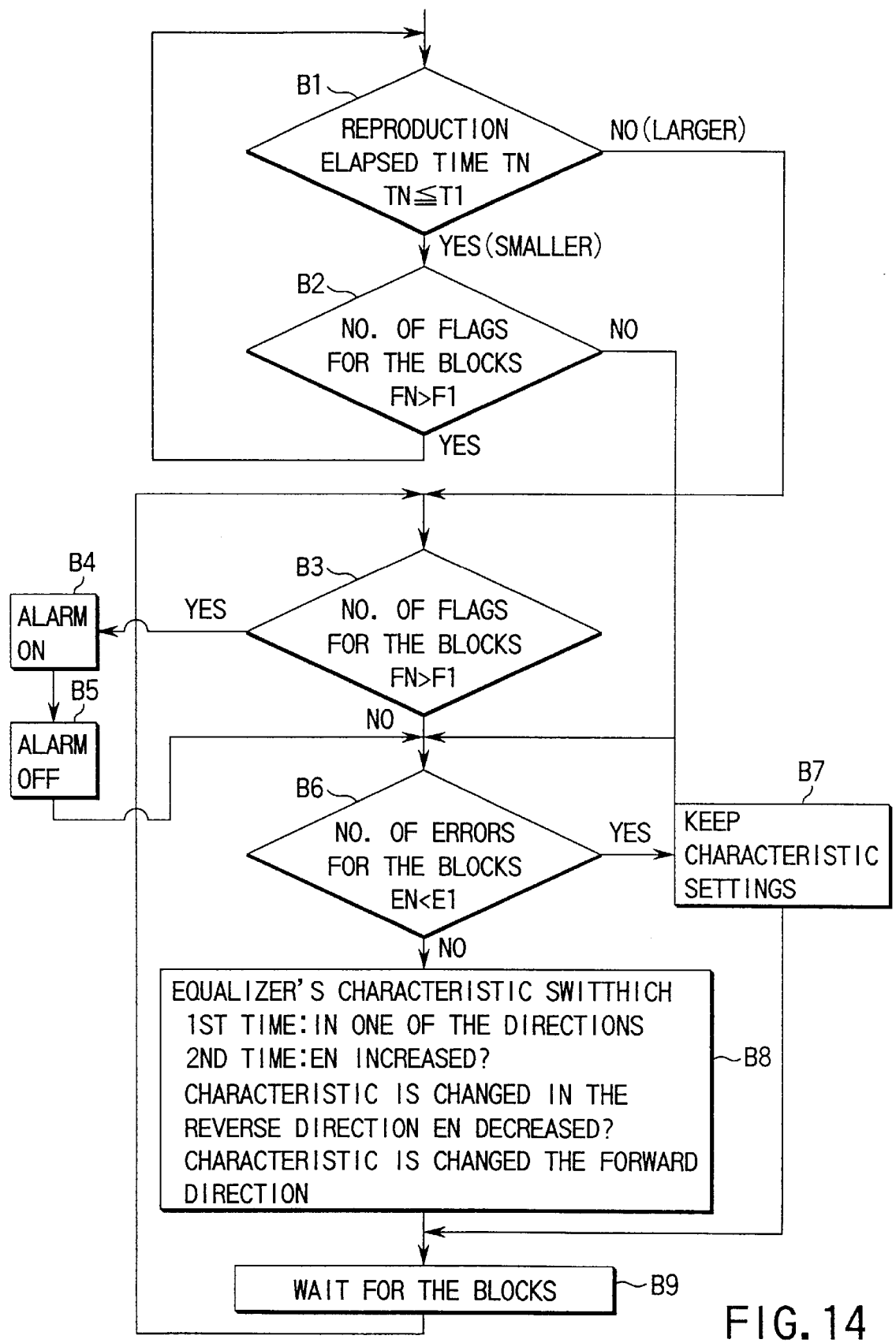
FIG. 14 is a flowchart of the operation of the second embodiment.

FIG. 14 shows the procedure of the control operation of the error rate sensing section 72. After the optical disk reproducing device has started, the error rate sensing section 72 judges whether or not the reproduction elapsed time TN has exceeded a specific time T1 (step B1). The reason is that the probability that errors will occur in the data is high at the start of the optical disk reproducing device.

Thereafter, the error rate sensing section 72 judges whether or not the number of flags FN for the blocks to be subjected to error correction has exceeded a specific number F1 (step B2) and goes to the process at step B1.

When the reproduction elapsed time TN has exceeded T1, the error rate sensing section 72 goes to step B3 and judges again whether or not the number of flags FN for the blocks is equal to or more than the specific number F1. When the number of flags FN is equal to or more than the specific number F1 during normal reproduction after the specific time T1 has elapsed, there is a strong possibility that, for example, a flaw in the optical disk 51 causes an abnormality. Therefore, the error rate sensing section 72 turns on and off an alarm (steps B4, B5).

If the number of flags FN is smaller than F1, the error rate sensing section 72 will judge at step B6 whether or not the number of errors EN for the blocks is equal to or smaller that a specific number E1. If the number of errors EN is equal to or smaller than the specific number E1, the error rate sensing section 72 will judge that the present reproduction characteristic matches with the optical disk 51 being reproduced and will maintain the present characteristic (step B7).

If the number of errors EN is larger than E1, the error rate sensing section 72 will judge that the waveform equalization characteristic of the waveform equalizer 55 does not match with the optical disk and will change the waveform equalization characteristic to the first direction in the first time (step B8). Then, after the error rate sensing section 72 has waited for the signal processing time of the blocks (step B9), it returns to step B3 and judges again whether or not the number of errors EN has increased or decreased.

In the second time, if the number of errors has decreased, the error rate sensing section 72 will judge that the direction of control has been correct and will switch the waveform equalization characteristic in the control direction. Conversely, if the number of errors EN has increased, the error rate sensing section 72 will judge that the direction of control has been wrong and will switch the waveform equalization of the waveform equalizer 55 in the opposite direction to that in the first time, and return to step B3 again.

Control of the waveform equalization characteristic of the waveform equalizer 55 enables the data to be reproduced in the best condition. Control of characteristic at that time can be achieved by controlling the amplitude or delay characteristic of the waveform equalizer 55 or by controlling both of the amplitude and delay characteristics.

Figure 15:
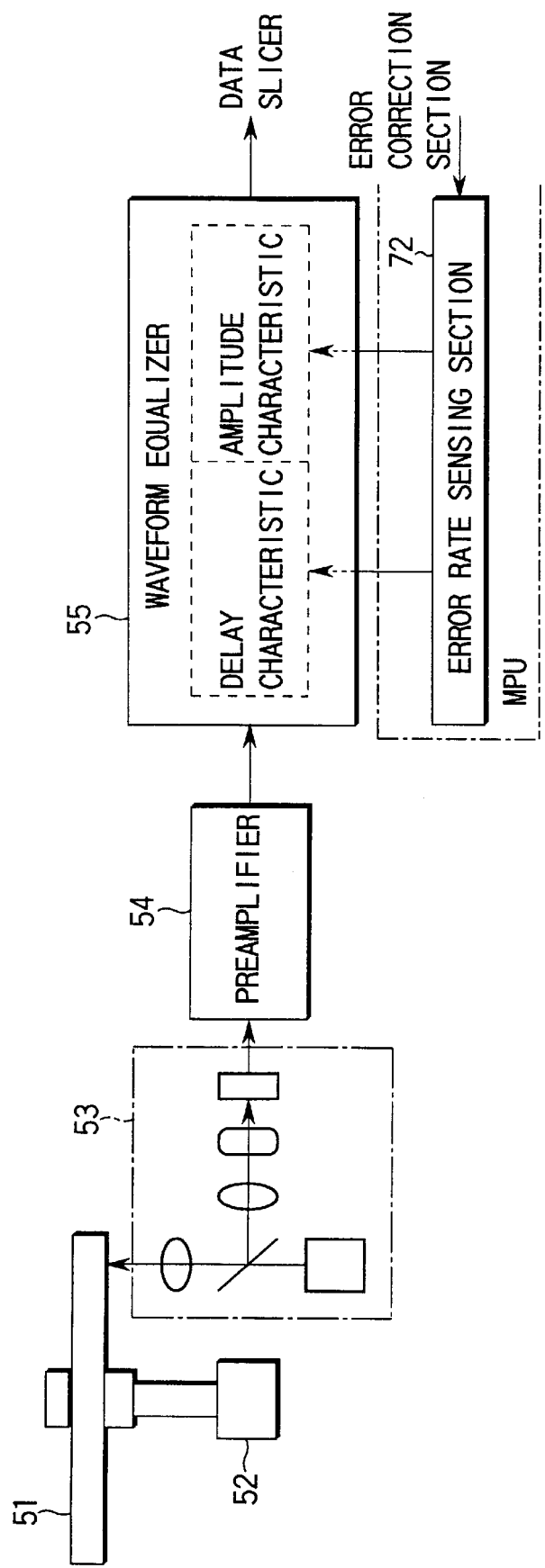
FIG. 15 is a detailed block diagram of elements of the waveform equalization characteristic portion of the second embodiment.

FIG. 15 shows various examples of what is controlled in controlling the waveform equalization characteristic of the waveform equalizer 55. The waveform equalizer 55 can change each of its delay characteristic and amplitude characteristic. Control of these characteristics is through the error rate sensing section 72 which generates a delay characteristic control signal and an amplitude characteristic control signal. The error rate sensing section 72 is composed of, for example, a microprocessor MPU.

In the waveform equalizer 55, the amount of delay of the delay elements D may be changed to switch the characteristic or the value of coefficient k in a multiplier that multiplies the output of each delay element D by a coefficient may be changed to switch the characteristic.

Figure 16:
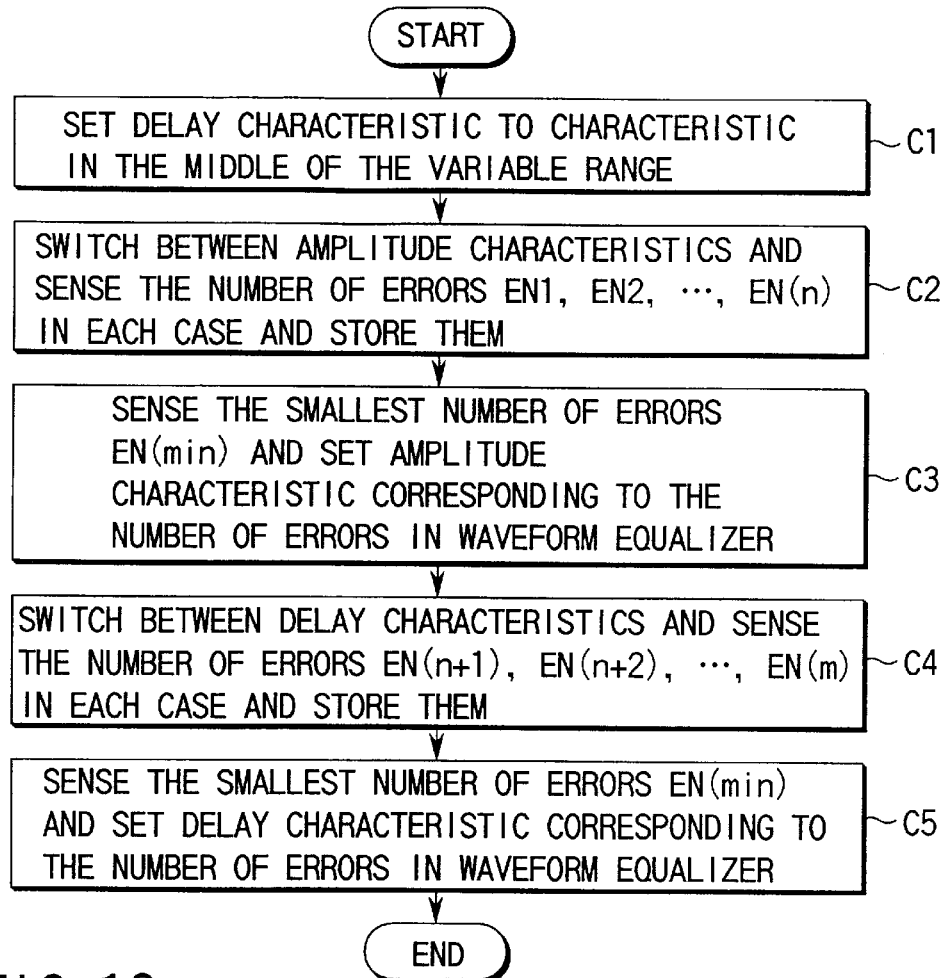
FIG. 16 is a flowchart of the operation of a modification of the second embodiment.

FIG. 16 shows an example of the operation of switching the characteristic of the waveform equalizer 55. In this example, a waveform equalization characteristic that realizes the smallest number of errors is set. Therefore, the operation in the example differs slightly from the operation of setting a characteristic that realizes a number of errors smaller than a specific value as shown in FIG. 14.

The error rate sensing section 72 sets the delay characteristic of the waveform equalizer 55 to a characteristic in the middle of its variable range (step C1). Next, the error rate sensing section 72 changes the amplitude characteristic of the waveform equalizer 55 at several stages and stores the numbers of errors EN1, EN2, . . . , EN(n) for each amplitude characteristic set. Then, the error rate sensing section 72 senses the smallest one EN(min) of these numbers of errors and sets the amplitude characteristic corresponding to the smallest number of errors EN(min) again in the waveform equalizer 55 (steps C2, C3).

Next, the error rate sensing section 72 changes the delay characteristic of the waveform equalizer 55 at several stages and stores the numbers of errors EN(n+1), EN(n+2), . . . , EN(m) for each delay characteristic set. Then, the error rate sensing section 72 senses the smallest one EN(min) of these numbers of errors and sets the delay characteristic corresponding to the smallest number of errors EN(min) again in the waveform equalizer 55 (steps C4, C5).

By carrying out the above-described processes, the recorded data on the optical disk 51 can be obtained in the best condition. The control process may be performed in regular intervals of time or be executed in the first specific period of time and thereafter be kept in a specific fixed state. The control process may also be executed according to the reproduction position on the optical disk 51.

With the second embodiment, the modulated signal recorded on the optical disk 51 is read and the error occurrence rate in correcting errors in the binarized output of the modulated signal or the modulated signal itself is monitored. According to the contents of the error occurrence rate information, the best waveform equalization characteristic can be set.

Figure 17:
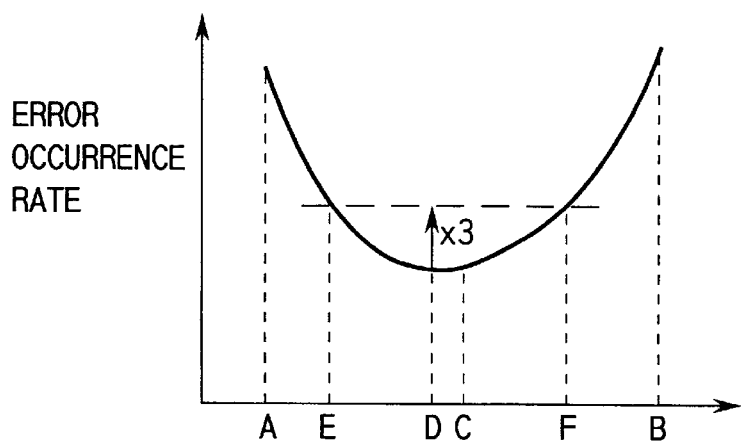
FIG. 17 is a characteristic diagram to help explain another modification of the second embodiment.
Figure 18:
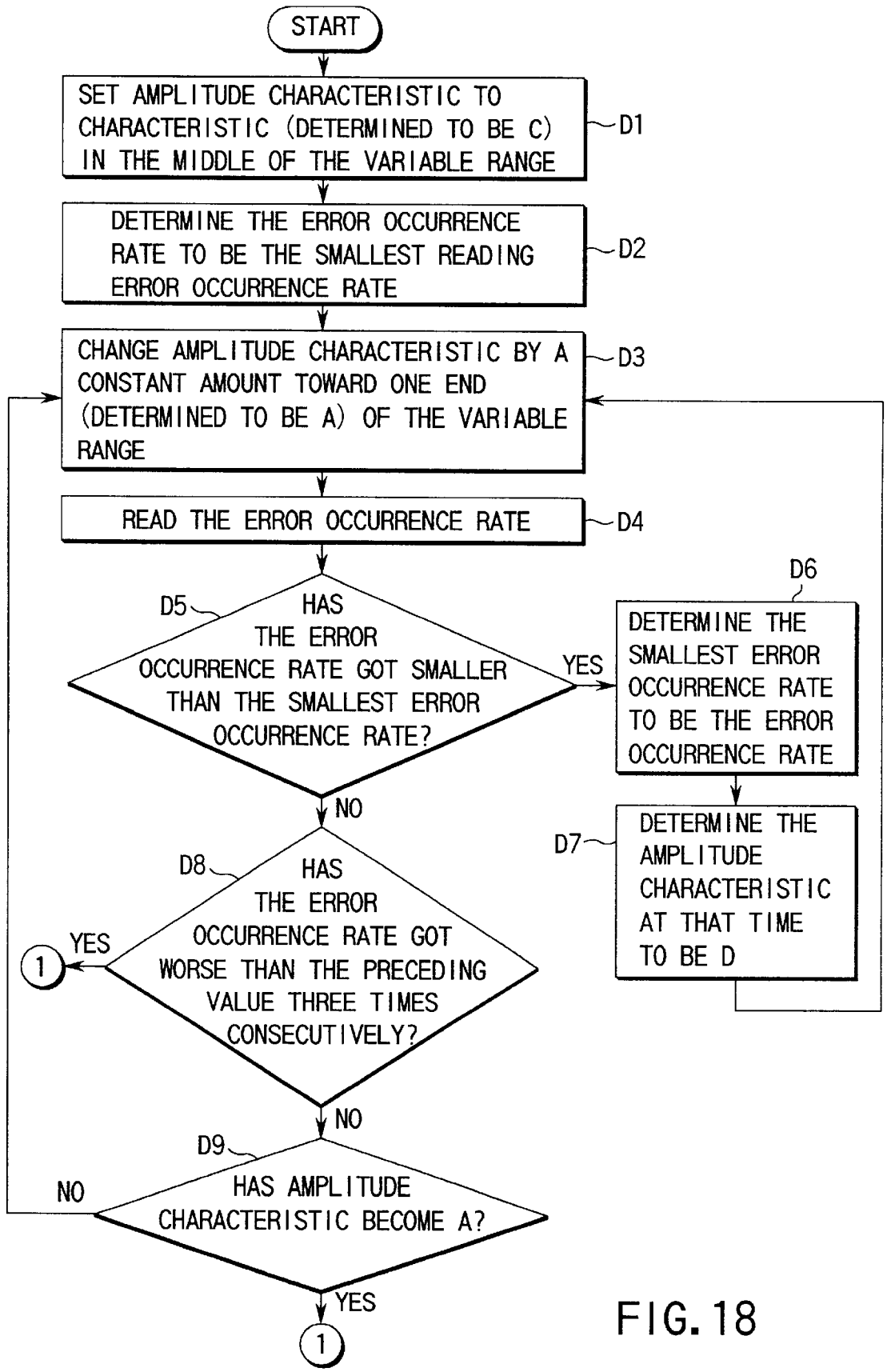
FIGS. 18 to 21 are flowcharts of the operation of the modification of FIG. 17.
Figure 19:
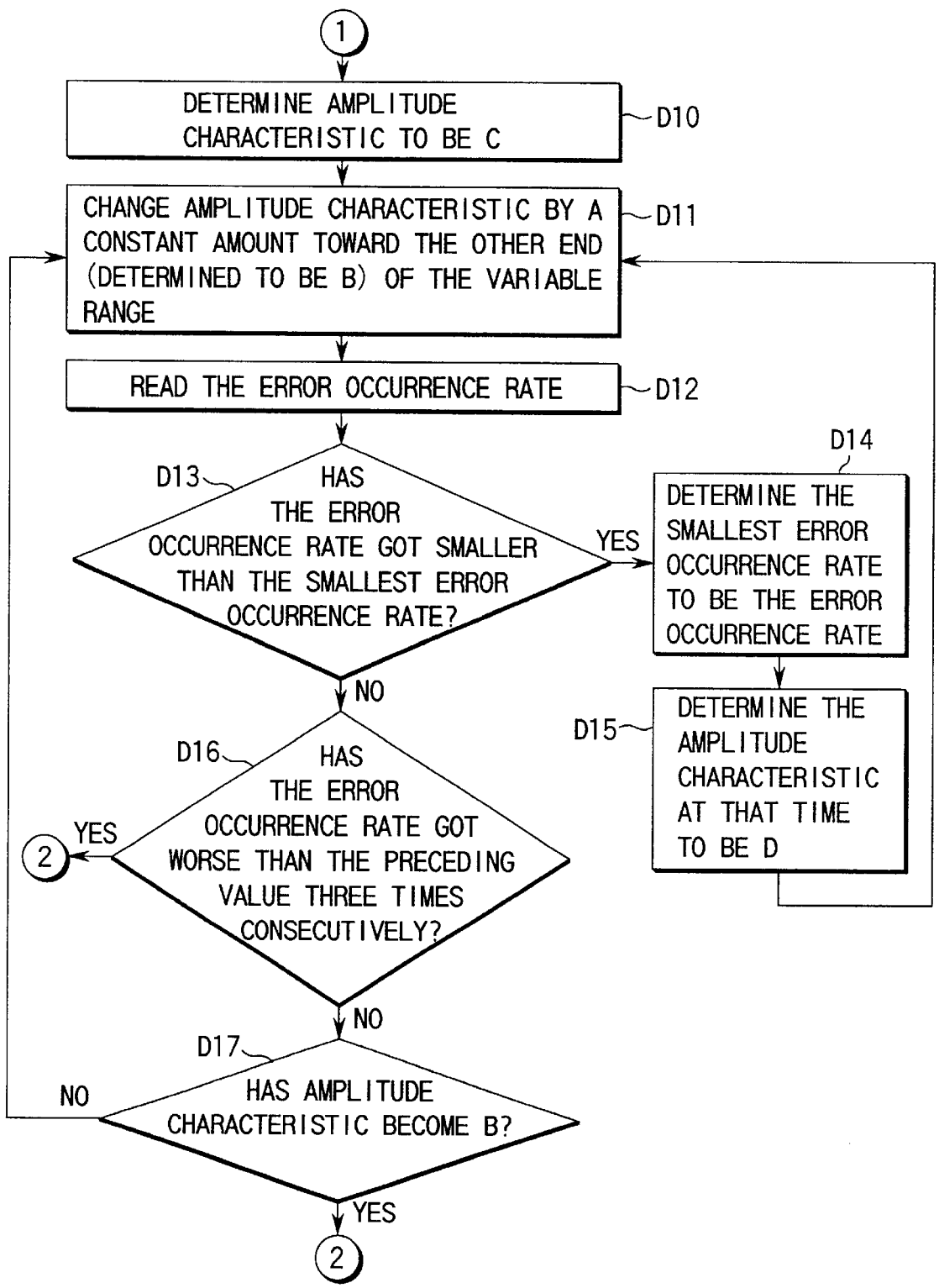
Figure 20:
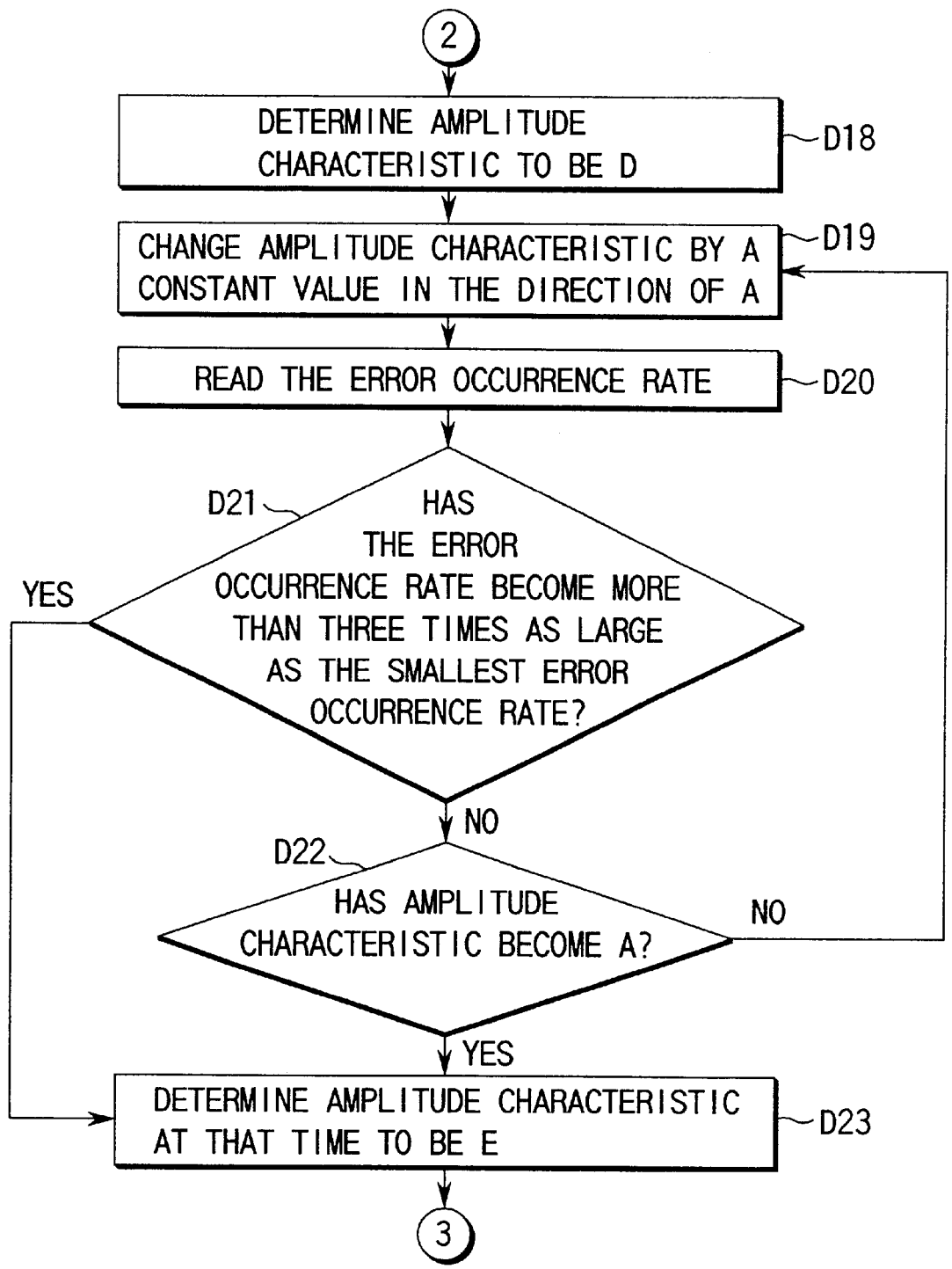
Figure 21:
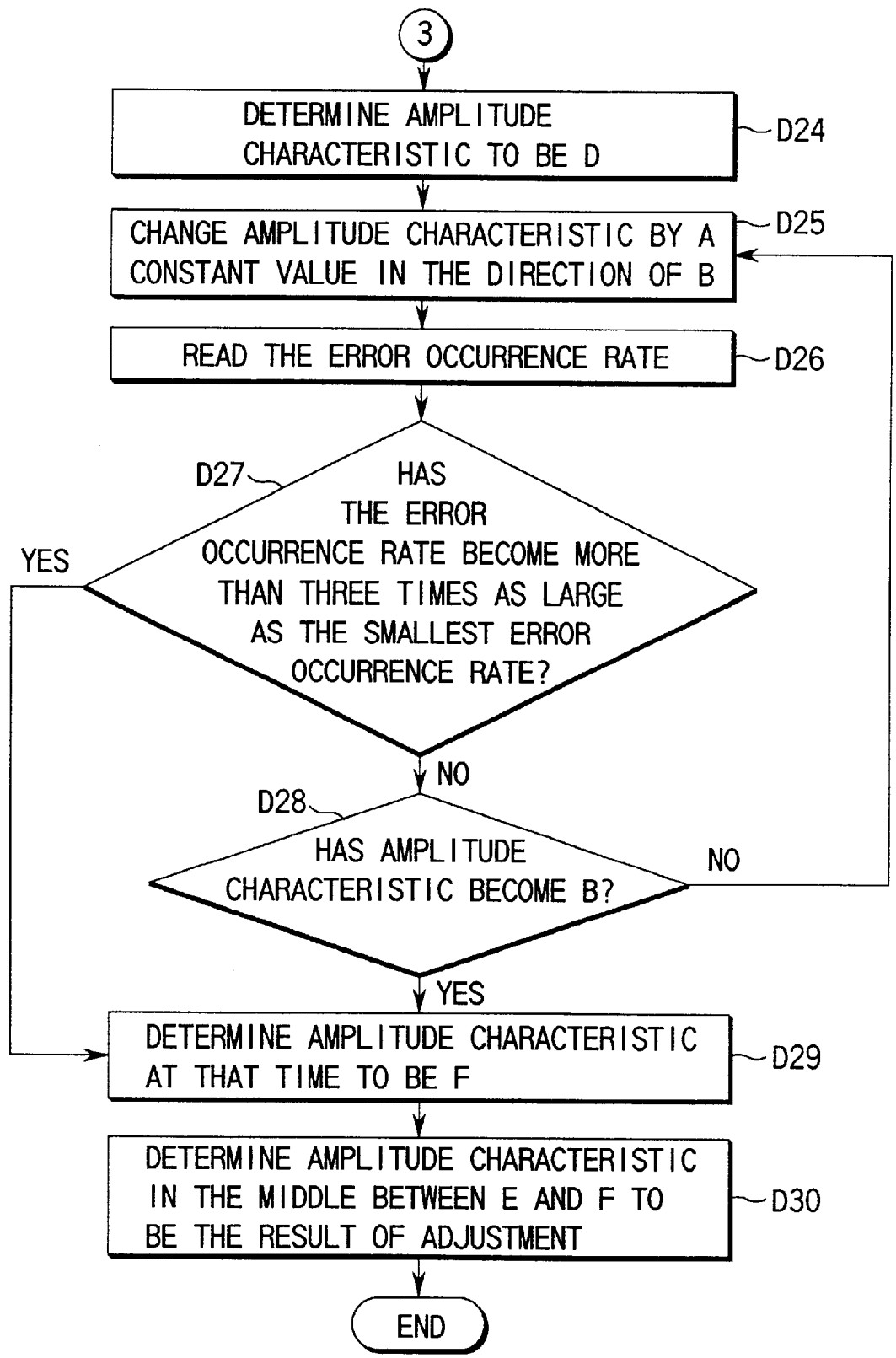

Another example of switching the characteristic of the waveform equalizer 55 will be explained. FIG. 17 shows the change of the error rate with respect to the change of the amplitude characteristic of the waveform equalizer 55. It is assumed that the variable range of the amplitude characteristic of the waveform equalizer 55 is from A to B. The characteristic is set to amplitude characteristic C in the middle of the variable range. On the basis of the error rate at that time, an amplitude characteristic D for which the error rate is the smallest is found.

Thereafter, the amplitude characteristic is changed in regular intervals, starting from D to A and an amplitude characteristic E for which the error rate is three times as large as the smallest error rate. Then, the amplitude characteristic is changed in regular intervals, starting from D to B and an amplitude characteristic F for which the error rate is three times as large as the smallest error rate. Then, an amplitude characteristic in the middle between E and F is set as the best amplitude characteristic.

FIGS. 18 to 21 are flowcharts for switching of the waveform equalization characteristic as described above. First, the error rate sensing section 72 sets the amplitude characteristic of the waveform equalizer 55 to characteristic C in the middle of the variable range (step D1) and reads the error rate at that time (step D2). Thereafter, the error rate sensing section 72 changes the amplitude characteristic of the waveform equalizer 55 at regular intervals, starting from C to A, thereby finding an amplitude characteristic D for which the error rate is the smallest (steps D3 to D9).

Then, the error rate sensing section 72 changes the amplitude characteristic of the waveform equalizer 55 at regular intervals, starting from C to B, to search for an amplitude characteristic D for which the error rate is smaller than the error rate with the previously obtained amplitude characteristic D (steps D10 to D17). As a result, the error rate sensing section finds the amplitude characteristic D for which the error rate is the smallest in the range from A to B.

Thereafter, the error rate sensing section 72 changes the amplitude characteristic of the waveform equalizer 55 at regular intervals, starting from D to A, to find an amplitude characteristic E for which the error rate is three times as large as the smallest error rate (steps D18 to D23). Then, the error rate sensing section 72 changes the amplitude characteristic of the waveform equalizer 55 at regular intervals, starting from D to B, to find an amplitude characteristic F for which the error rate is three times as large as the smallest error rate (steps D24 to D29).

Then, the error rate sensing section 72 sets the amplitude characteristic in the middle between the obtained amplitude characteristics E and F as the best amplitude characteristic (steps D30).

In the above explanation, the amplitude characteristic has been controlled to switch the waveform equalization characteristic of the waveform equalization circuit 55. The present invention is not limited to this. The waveform equalization characteristic may be switched by controlling the delay characteristic or both of the amplitude and delay characteristics.

The present invention is not restricted to the above embodiments, but may be practiced or embodied in still other ways without departing from the spirit or essential character thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A recording medium, said recording medium comprising:

recorded data, part of which includes a parameter for obtaining at least a waveform equalization characteristic serving as a reference, wherein a waveform equalizer circuit switches its waveform equalization characteristic based upon content of said parameter for obtaining at least a waveform equalization characteristic.

2. The recording medium as claimed in claim 1, wherein said recorded data is to be read by an optical pickup, and said parameter indicates the length of a unit bit of said recorded data on said recording medium.

3. The recording medium as claimed in claim 1, wherein said parameter indicates that the linear density of said recorded data on said recording medium is at least one of 0.267 $\mu$m/bit, 0.293 $\mu$m/bit, and 0.409 to 0.435 $\mu$m/bit.

4. The recording medium as claimed in claim 1, wherein said modulated data is recorded in a lead-in area on said recording medium.

5. The recording medium as claimed in claim 1, wherein more than one type of said parameter has been recorded to specify the characteristic of each section of a reproducing device.

6. The recording medium as claimed in claim 1, wherein said parameter is identification data for identifying a type of said recording medium.

7. The recording medium as claimed in claim 1, wherein said recorded data is to be read by an optical pickup, and said parameter is data for changing said waveform equalization characteristic by controlling the frequency versus amplitude characteristic for a high-frequency modulated signal output from said optical pickup.

8. The recording medium as claimed in claim 1, wherein said recorded data is to be read by an optical pickup, and said parameter is data for changing said waveform equalization characteristic by controlling the frequency versus delay characteristic for a high-frequency modulated signal output from said optical pickup.

9. A recording medium having data recorded in a data recording area, from which said data recorded in said data recording area is reproduced by a reproducing device including a pickup for reading said data recorded in said data recording area, a waveform equalizer which subjects a high-frequency modulated signal output from said pickup to a waveform equalization process, and a demodulator which subjects an output signal of said waveform equalizer to a demodulation process, said recording medium comprising:

a parameter recorded in said data recording area and indicating the recording format of said data recorded in said data recording area, wherein said waveform equalizer is designed to switch its waveform equalization characteristic based on contents of said parameter demodulated by said demodulator.

10. A reproducing device for reproducing a recording medium on which a parameter for obtaining at least a waveform equalization characteristic best suited for reading recorded data has been recorded as part of said recorded data, said reproducing device comprising:

a pickup for reading said recorded data from said recording medium;

a waveform equalizer which subjects a high-frequency modulated signal output from said pickup to a waveform equalization process;

a demodulator which subjects an output signal of said waveform equalizer to a demodulation process; and a switch which switches said waveform equalization characteristic of said waveform equalizer based on contents of said parameter subjected to said demodulation process at said demodulator.

11. The reproducing device as claimed in claim 10, wherein said switch changes said waveform equalization characteristic by controlling said waveform equalizer's frequency versus amplitude characteristic for a high-frequency modulated signal output from said optical pickup.

12. The reproducing device as claimed in claim 10, wherein said switch changes said waveform equalization characteristic by controlling said waveform equalizer's frequency versus delay characteristic for a high-frequency modulated signal output from said optical pickup.

13. The reproducing device as claimed in claim 10, wherein said switch changes said waveform equalization characteristic by controlling both of said waveform equalizer's frequency versus amplitude characteristic and frequency versus delay characteristic for a high-frequency modulated signal output from said optical pickup.

14. The reproducing device as claimed in claim 10, said reproducing device further comprising:

a selector which determines a type of said recording medium based on contents of said parameter subjected to said demodulation process at said demodulator.

* * * * *